United States Patent  
Gealy et al.

Patent No.: US 12,427,546 B2
Date of Patent: Sep. 30, 2025

(54) SYSTEM AND METHOD FOR ROBOTIC HORIZONTAL SORTATION

(71) Applicant: Ambi Robotics, Inc., Emeryville, CA (US)

(72) Inventors: David Gealy, Berkeley, CA (US); Stephen McKinley, Berkeley, CA (US); Matthew Matl, Fremont, CA (US); Jeffrey Mahler, Berkeley, CA (US); Aaron Smith, Suisun City, CA (US)

(73) Assignee: Ambi Robotics, Inc., Berkeley, CA (US)

(*) Notice: Subject to any disclaimer, the term of this patent is extended or adjusted under 35 U.S.C. 154(b) by 0 days.

(21) Appl. No.: 17/468,220

(22) Filed: Sep. 7, 2021

(65) Prior Publication Data
US 2022/0072587 A1 Mar. 10, 2022

Related U.S. Application Data

(60) Provisional application No. 63/075,046, filed on Sep. 4, 2020.

(51) Int. Cl.
B07C 3/06 (2006.01)
B07C 5/36 (2006.01)
(Continued)

(52) U.S. Cl.
CPC .............. B07C 3/06 (2013.01); B07C 5/36 (2013.01); B65G 1/065 (2013.01); B65G 1/1378 (2013.01);
(Continued)

(58) Field of Classification Search
CPC ........ B07C 3/06; B07C 5/36; B07C 2501/0063
(Continued)

(56) References Cited

U.S. PATENT DOCUMENTS 2,702,038 A 2/1955 Olof et al.
2,916,059 A 12/1959 Wong
(Continued)

FOREIGN PATENT DOCUMENTS

EP 3520973 A1 8/2019
JP 2018-144225 9/2018
(Continued)

OTHER PUBLICATIONS

U.S. Appl. No. 17/404,748, filed Aug. 17, 2021, Matthew Matl.
(Continued)

Primary Examiner — Michael McCullough
Assistant Examiner — Molly K Devine
(74) Attorney, Agent, or Firm — Vista IP Law Group, LLP

(57) ABSTRACT

A system and method for item sorting that can include an item selection unit with a robotic pick-and-place machine positioned adjacent to a defined input item region; an item sortation unit comprising a horizontal multi-degree-of-freedom gantry system and an item tote array, wherein the horizontal gantry system is positioned above the item tote array; wherein the item sortation unit further comprises an item holding and depositing system that is coupled to and actuated by the gantry system. The system and method can singulate an item from a collection of items and sort into one of a set of item totes.

20 Claims, 33 Drawing Sheets

(51) Int. Cl.
*B65G 1/06* (2006.01)
*B65G 1/137* (2006.01)
*B65G 47/96* (2006.01)

(52) U.S. Cl.
CPC ...... *B07C 2501/0063* (2013.01); *B65G 47/96* (2013.01)

(58) Field of Classification Search
USPC .......................................................... 209/657
See application file for complete search history.

(56) References Cited

U.S. PATENT DOCUMENTS

| | | | |
|---|---|---|---|
| 3,005,652 | A | 10/1961 | Helm |
| 3,729,085 | A * | 4/1973 | Schlueter ............... B65G 47/24 198/792 |
| 3,743,340 | A | 7/1973 | Williamann |
| 3,901,502 | A | 8/1975 | Vits |
| 4,917,427 | A | 4/1990 | Scaglia |
| 5,192,070 | A | 3/1993 | Nagai et al. |
| 5,344,202 | A | 9/1994 | Ramler et al. |
| 5,882,055 | A | 3/1999 | Smith |
| 6,193,291 | B1 | 2/2001 | Morroney |
| 6,517,130 | B1 | 2/2003 | Donoso et al. |
| 7,000,964 | B1 | 2/2006 | Porras et al. |
| 8,251,415 | B2 | 8/2012 | Lomerson |
| 8,560,121 | B2 | 10/2013 | Hjornet |
| 8,960,751 | B2 | 2/2015 | Regan et al. |
| 8,997,438 | B1 | 4/2015 | Fallas |
| 10,017,285 | B2 * | 7/2018 | Boudreau ............... B65B 35/36 |
| 10,217,074 | B1 | 2/2019 | Stallman et al. |
| 2002/0047352 | A1 | 4/2002 | Shimizu |
| 2012/0319416 | A1 | 12/2012 | Ellis et al. |
| 2013/0341254 | A1 | 12/2013 | Bauer et al. |
| 2014/0180958 | A1 | 6/2014 | Arunapuram et al. |
| 2015/0032252 | A1 | 1/2015 | Galluzzo et al. |
| 2017/0080566 | A1 | 3/2017 | Stubbs et al. |
| 2017/0157648 | A1* | 6/2017 | Wagner ..................... B07C 3/14 |
| 2018/0148272 | A1 | 5/2018 | Wagner et al. |
| 2018/0312336 | A1* | 11/2018 | Wagner .................. B25J 9/1615 |
| 2019/0061174 | A1 | 2/2019 | Robinson et al. |
| 2019/0062055 | A1 | 2/2019 | Hance et al. |
| 2019/0240813 | A1 | 8/2019 | Nakayama et al. |
| 2019/0240847 | A1 | 8/2019 | Quast et al. |
| 2019/0369600 | A1 | 12/2019 | Lager |
| 2020/0047352 | A1 | 2/2020 | Nakayama et al. |
| 2020/0048014 | A1 | 2/2020 | Nakayama et al. |
| 2020/0160011 | A1 | 5/2020 | Wagner et al. |
| 2020/0223066 | A1 | 7/2020 | Diankov et al. |
| 2021/0308874 | A1 | 10/2021 | Gealy et al. |
| 2021/0308875 | A1 | 10/2021 | Gealy et al. |
| 2022/0048707 | A1 | 2/2022 | Matl et al. |

FOREIGN PATENT DOCUMENTS

| | | |
|---|---|---|
| JP | 2019-135072 | 8/2019 |
| JP | 2020-23022 | 2/2020 |
| WO | WO 2021/202894 | 10/2021 |

OTHER PUBLICATIONS

PCT International Search Report for International Appln. No. PCT/US21/49264, Applicant Ambidextrous, Inc., dated Dec. 16, 2021 (10 pages).
Extended European Search Report for EP Patent Appln. No. 21865263.4 dated Feb. 2, 2024.
A. Ali, M. Hosseini, and B. Sahari, "A review of constitutive models for rubber-like materials," American Journal of Engineering and Applied Sciences, vol. 3, No. 1, pp. 232-239, 2010.
N. Correll, K. E. Bekris, D. Berenson, O. Brock, A. Causo, K. Hauser, K. Okada, A. Rodriguez, J. M. Romano, and P. R. Wurman, "Analysis and observations from the first amazon picking challenge," IEEE Transactions on Automation Science and Engineering, 2016.
C. Eppner, S. Hofer, R. Jonschkowski, R. M. Martin, A. Sieverling, V. Wall, and O. Brock, "Lessons from the amazon picking challenge: Four aspects of building robotic systems." in Robotics: Science and Systems, 2016.
C. Hernandez, M. Bharatheesha, W. Ko, H. Gaiser, J. Tan, K. van Deurzen, M. de Vries, B. Van Mil, J. van Egmond, R. Burger, et al., "Team delft's robot winner of the amazon picking challenge 2016," arXiv preprint arXiv:1610.05514, 2016.
X. Provot et al., "Deformation constraints in a mass-spring model to describe rigid cloth behaviour," in Graphics interface. Canadian Information Processing Society, 1995, pp. 147-14.
H. S. Stuart, M. Bagheri, S. Wang, H. Barnard, A. L. Sheng, M. Jenkins, and M. R. Cutkosky, "Suction helps in a pinch: Improving underwater manipulation with gentle suction flow," in Intelligent Robots and Systems (IROS), 2015 IEEE/RSJ International Conference on. IEEE, 2015, pp. 2279-2284.
B. Bahr, Y. Li, and M. Najafi, "Design and suction cup analysis of a wall climbing robot," Computers & electrical engineering, vol. 22, No. 3, pp. 193-209, 1996.
N. C. Tsourveloudis, R. Kolluru, K. P. Valavanis, and D. Gracanin, "Suction control of a robotic gripper: A neuro-fuzzy approach," Journal of Intelligent & Robotic Systems, vol. 27, No. 3, pp. 215-235, 2000.
A. J. Valencia, R. M. Idrovo, A. D. Sappa, D. P. Guingla, and D. Ochoa, "A 3d vision based approach for optimal grasp of vacuum grippers," in Electronics, Control, Measurement, Signals and their Application to Mechatronics (ECMSM), 2017 IEEE International Workshop of. IEEE, 2017, pp. 1-6.
K.-T. Yu, N. Fazeli, N. Chavan-Dafle, O. Taylor, E. Donlon, G. D. Lankenau, and A. Rodriguez, "A summary of team MIT's approach to the amazon picking challenge 2015," arXiv preprint arXiv:1604.03639, 2016.
A. Zeng, S. Song, K.-T. Yu, E. Donlon, F. R. Hogan, M. Bauzá, D. Ma, O. Taylor, M. Liu, E. Romo, N. Fazeli, F. Alet, N. Chavan-Dafle, R. Holladay, I. Morona, P. Q. Nair, D. Green, I. Taylor, W. Liu, T. A. Funkhouser, A. Rodriguez, "Robotic pick-and-place of novel objects in clutter with multi-affordance grasping and cross-domain image 2017 matching", in IEEE International Conference on Robotics and Automation (ICRA), 2017.
D. Morrison, A. W. Tow, M. McTaggart, R. Smith, N. Kelly-Boxall, S. Wade-McCue, J. Erskine, R. Grinover, A. Gurman, T. Hunn, D. Lee, A. Milan, T. Pham, G. Rallos, A. Razjigaev, T. Rowntree, K. Vijay, Z. Zhuang, C. Lehnert, I. Reid, P. Corke, J. Leitner, "Cartman: The low-cost cartesian manipulator that won the amazon robotics challenge", in IEEE International Conference on Robotics and Automation (ICRA) (IEEE, 2018), pp. 7757-7764.
R. Kolluru, K. P. Valavanis, and T. M. Hebert, "Modeling, analysis, and performance evaluation of a robotic gripper system for limp material handling," IEEE Transactions on Systems, Man, and Cybernetics, Part B (Cybernetics), vol. 28, No. 3, pp. 480-486, 1998.
G. Mantriota, "Theoretical model of the grasp with vacuum gripper," Mechanism and machine theory, vol. 42, No. 1, pp. 2-17, 2007.
Y. Yoshida and S. Ma, "Design of a wall-climbing robot with passive suction cups," in Robotics and Biomimetics (ROBIO), 2010 IEEE International Conference on. IEEE, 2010, pp. 1513-1518.
U.S. Appl. No. 62/962,391, filed Jan. 17, 2020, Gealy.
"Vacuum End Effectors VEE," Schmalz, The Indicated Copyright Date On Document is May 2018.
Mahler, J., et al., "Dex-Net 3.0: Computing Robust Vacuum Suction Grasp Targets in Point Clouds using a New Analytic Model and Deep Learning," IEEE International Conference on Robotics and Automation, dated Sep. 2017.
Mahler, J., et al., "Learning ambidextrous robot grasping policies," Science Robotics 4 (26), dated Jan. 16, 2019.
Correa, C., et al., "Robust Toppling for Vacuum Suction Grasping," 2019 IEEE 15th International Conference on Automation Science and Engineering (CASE), dated Aug. 2019.

* cited by examiner

SYSTEM AND METHOD FOR ROBOTIC HORIZONTAL SORTATION

CROSS-REFERENCE TO RELATED APPLICATIONS

This application claims the benefit of U.S. Provisional Application No. 63/075,046, filed on 4 Sep. 2020, which is incorporated in its entirety by this reference.

GOVERNMENT RIGHTS

This invention was made with government support under Grant 2014689 awarded by The National Science Foundation. The government has certain rights in the invention.

TECHNICAL FIELD

This invention relates generally to the field of automated item sortation, and more specifically to a new and useful system and method for robotic horizontal sortation.

BACKGROUND

Tens of billions of parcels are shipped each year in the United States. Each of these parcels must be inducted into a shipping system and sorted to facilitate processing of shipments by isolated routes or areas. Despite advances in automation, parcel sortation remains a difficult and labor-intensive problem.

Linear sorters (such as bombay sorters) are effective but as the desired number of outputs increase the cost, size, and complexity of the system become untenable.

A typical manual parcel sortation station has one input area and approximately 50 output locations for parcels. A single facility may sort to over 1000 destinations. However, a conveyor-based sortation method with 1000 outputs would be massive and costly. In many situations, a site simply would not have the floor space to accommodate one of the available automated sorting solutions. Conversely, if a robot sorts items to its immediate vicinity, the reachability of the robot would limit the number of outputs, which is not a practical solution to many high scale problems.

Thus, there is a need in the automated item sorting field to create a new and useful system and method for robotic horizontal sortation. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

A system and method for robotic horizontal sortation functions as a modular and easily expandable item sorting solution that uses an item selection unit that includes a robotic pick-and-place machine to automate the singulation and identification of items from an item input region and an item sortation unit that includes a secondary sortation system for depositing items into a designated location in an array of containers. Within the system and method, the robotic pick-and-place machine is operated in synchronization with the secondary sortation system to move those items to a desired output location. The system and method functions to take disorganized items and automatically sort them to a plurality of outputs.

Figure 1A:
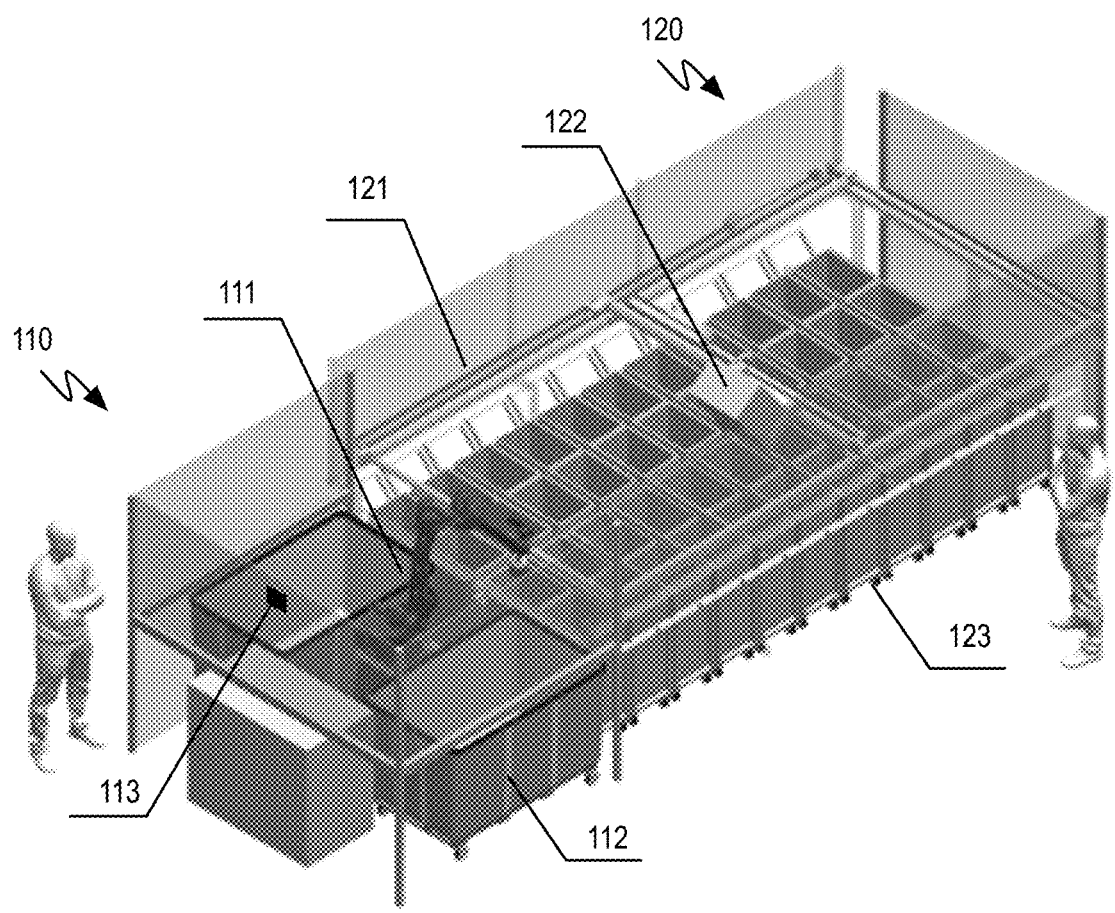
FIG. 1A is a schematic of one variation of the system.
Figure 1B:
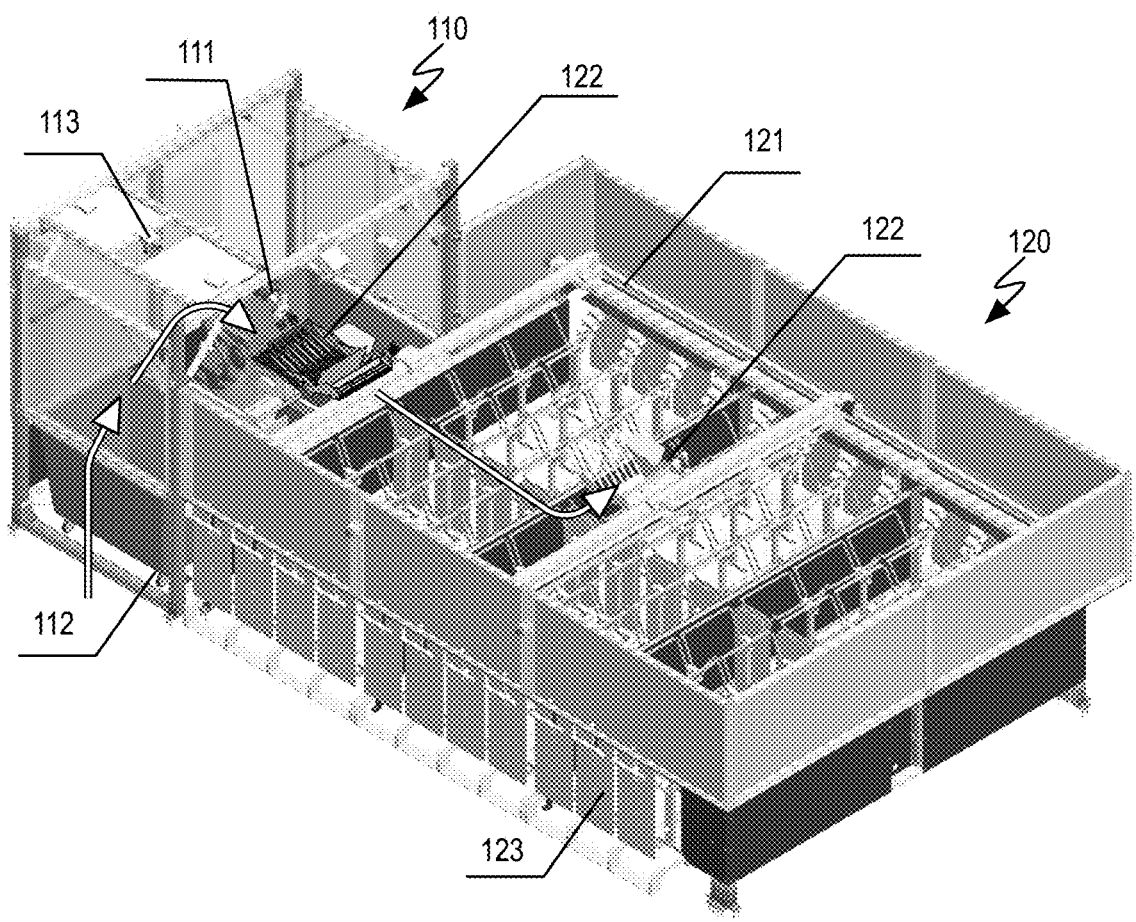
FIG. 1B is a schematic of one variation of the system with indication of item flow when sorting.

In one variation, the robotic pick-and-place machine is a robotic arm, and the secondary sort machine is a horizontal gantry system. The horizontal gantry system may include an actuated tray used to hold an item and to deposit the item into a targeted output location. The horizontal gantry system may alternatively include a second robotic pick-and-place machine or other type of component to hold an item and to deposit the item. As shown in FIG. 1A and FIG. 1B, the horizontal gantry system can have horizontal translation along two dimensions. As described herein, the system and method may include numerous variations and forms of implementation. One possible variation may include coupling of multiple item sortation units (e.g., multiple horizontal and/or vertical gantry systems). In another possible variation, multiple item selection units may work cooperatively with the same item sortation unit. In another possible variation, one item selection unit may operate in coordination with two item sortation unit (e.g., one on two opposing sides of the item selection unit).

The system and method are preferably used to select unsorted items from one or more input regions. The items may be contained within an input item bin in the input region and are herein described as such, though the form of presentation of input items is not limited to any particular container type. The robotic pick-and-place machine singulates the items from the input region by grasping or picking the item.

The robotic pick-and-place machine and/or other components of the item selection unit can additionally gather information such as dimensions and weight of the items. Individual item processing may additionally be performed such as scanning the item, evaluating the item (e.g., classifying quality, size, or a type of item), marking or otherwise modifying the item (e.g., stamping or applying a label), or performing any suitable form of processing. In some variations, scanning of the item may be used in planning placement of the item to facilitate more reliable hand off to the item sortation unit and depositing into a container.

The robotic pick-and-place machine then places the item into the secondary sortation system that moves the item into an output location. Because these two functions are separated, the overall throughput of the system can be significantly higher. The size of the output system is designed to statistically match the speed of the input (picking/scanning system).

Herein, reference will be made to "items" which characterizes the objects subjected to sortation by a robotic system. An item can be any suitable type of object such as a package, a parcel, a product, raw material good (e.g., a manufactured part), and/or any suitable type of object that needs sortation organization. In the case of shipping or other operational contexts, an item may have various properties. In a parcel processing center, items could be, for example: boxed goods, bagged goods, and/or parcels. An item could have a destination property indicating where it should be shipped. An item could have an item type property that could correspond to a stock keeping unit (SKU) identifier or an alternative product identifier.

Herein, reference is also made to "item totes" or more shortly "totes", which is used to characterize the receptacle used to hold items once sorted. The form factor and variety of the totes can vary greatly, and the system and method may be adapted to different types of totes such as boxes, bins, trays, bags, gaylords, and the like.

Herein reference is also made to "item bins", which is used to characterize how items are originally held or stored prior to picking and sorting into an appropriate tote. As with the totes, the form factor and variety of the item bins can vary greatly and the system and method may be adapted to different types of item bins such as boxes, bins, trays, bags, and the like. An item bin may include any suitable assortment of items but will generally require sorting into a multitude of different item totes. Item totes and bins may use any suitable form factor and, in some cases, may use the same type of container. In some variations, the form factor may be customized for particular variations and implementations of the system and method as described herein.

The system and method may be used in providing efficient sortation of items for a variety of applications.

In one exemplary application, the system and method can be used for consolidating parcels for shipping. For example, a parcel processing site may use the system and method to sort parcels by destinations (e.g., zip codes or delivery routes) for subsequent shipment processing. Unsorted letters and/or packages can be collected into large item bins and then the system and method can facilitate sorting those into smaller item totes for different delivery routes/destinations.

There is a high need for compact and modular sortation of items beyond parcels though and the system and method can similarly be applied to those applications.

In another exemplary application, the system and method may be used for cross docking where the case of the same or different items are split across to different outputs. When installed in a cross-docking facility, the system and method can improve supply-chain operation efficiency.

In another exemplary application, the system and method can be used for returned good processing and/or good restocking. For example, mixed item bins of returned goods could be appropriately sorted for reshelving, restocking, or other subsequent processing. In another example, newly received item orders could be sorted into appropriate bins for replenishing item stock within a store. The size and automated affordances of the system and method are such that it could be used in a variety of environments such as in a back-warehouse of a retail store or in an order fulfillment center (e.g., such as for ecommerce returns).

In another exemplary application, the system and method may be used for order fulfillment where a collection of items are sorted into individual item totes, where each item tote may be associated with a particular order. In a similar manner, the system and method may also be used for dynamic or custom kitting for industrial or consumer goods.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

As one potential benefit, the system and method may be usable with a wide variety of types of items. With parcels in particular, there may be a wide variety of package types such as letters, postcards, boxes, tubes, bubble mailers, polybags, and the like. The system and method can facilitate planning and execution of robotic grasps of unknown items using identity inference, possibly in combination with a depth and color camera. The robotic planning of the system and method can additionally address challenges in reaching items in clutter and reaching items in corners or less reachable positions.

As another potential benefit, the system and method may provide a space efficient solution for automated sorting of items. In this way, the system and method can enable sortation into a large number of different sorting groups. In some implementations, the number of sorting groups could range between 20-60. One skilled in the art would appreciate that such a range may be changed depending on implementations. Some variations could expand this capacity significantly depending on needs and space restrictions. Similarly, the system and method may also be modified for fewer sorting groups.

As a related potential benefit, the system and method may offer a substantially modular solution where it can be easy and quick to deploy a sorting solution. Multiple instances of a sorting system could be deployed in one site. Similarly, some variations may use coordinated operation between multiple item selection units, item sortation units, and/or supplementary conveyor or transport systems (e.g., automated robots for moving bins, totes, or items).

As another potential benefit, the system and method may be implemented in a way that can be safely integrated into an environment where workers may directly interact with the system. The system and method can include safety systems such that such normal interactions are safe and convenient. For example, output item totes may be easily removed from the system when they are filled with sorted items without needing to stop operation of the system or putting the worker at risk. The ability for human workers to safely interact during operation of the system and method thereby enhances its flexibility and usability. For example, human workers could manually remove filled item totes without halting or altering operation of the sorting system.

As another potential benefit, the system and method can provide convenient physical interfaces for further automation. This can make the system and method easily integrated into the operation of other automated systems such as input or output conveyors or mobile robots moving input item bins or output item totes.

2. System

As shown in FIGS. 1A and 1B, a system for robotic horizontal sortation can include an item selection unit 110 with a robotic pick-and-place machine 111 and an input item region 112, and an item sortation unit 120 that includes a horizontal translation system 121 with an item holding and depositing system 122 and an output tote array 123. The system can enable sorting of items as they flow from the input item region 112 to an output tote of the output tote array 123 as shown in FIG. 1B.

Figure 2:
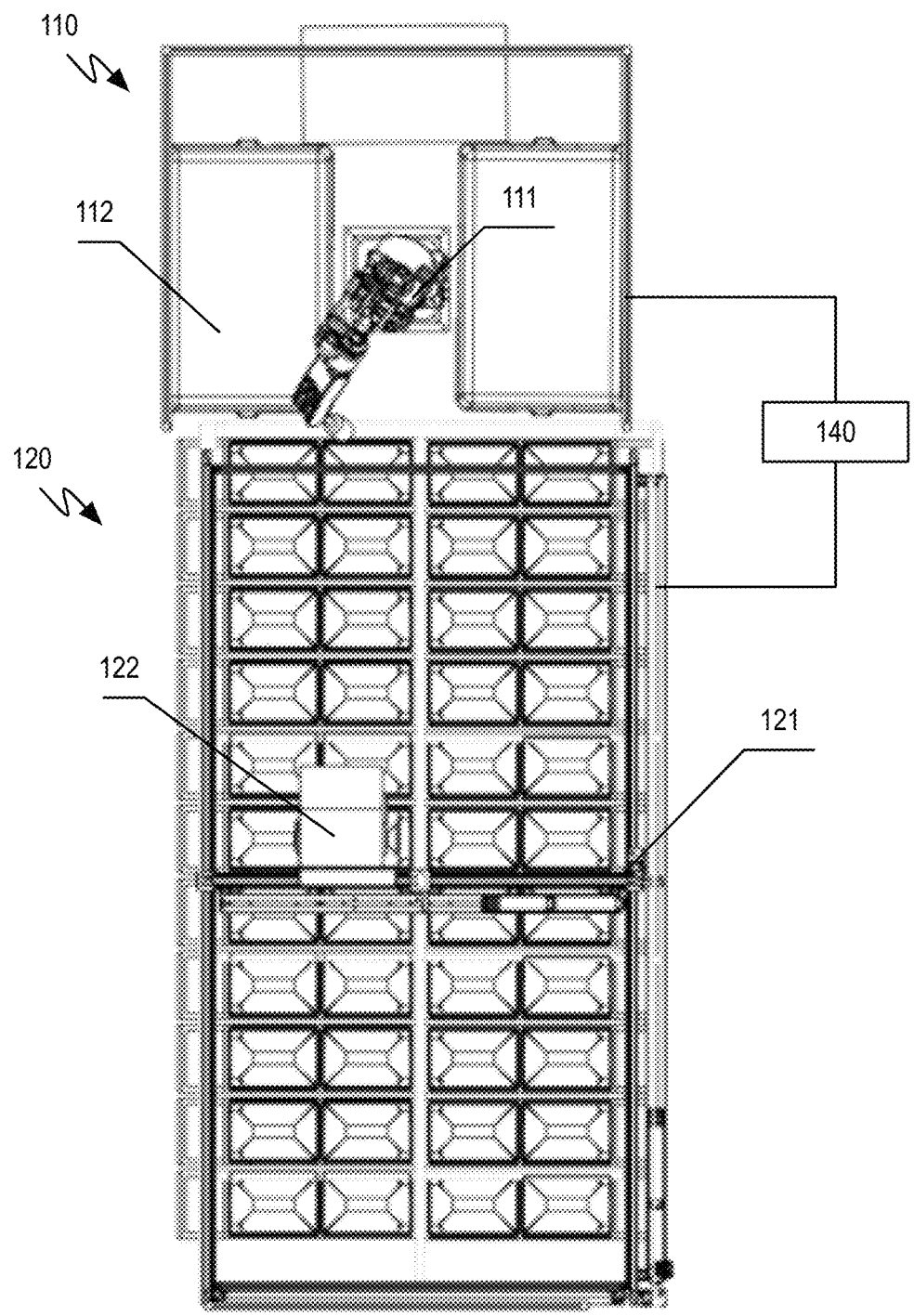
FIG. 2 is a schematic of a top view of one variation of the system.
Figure 3:
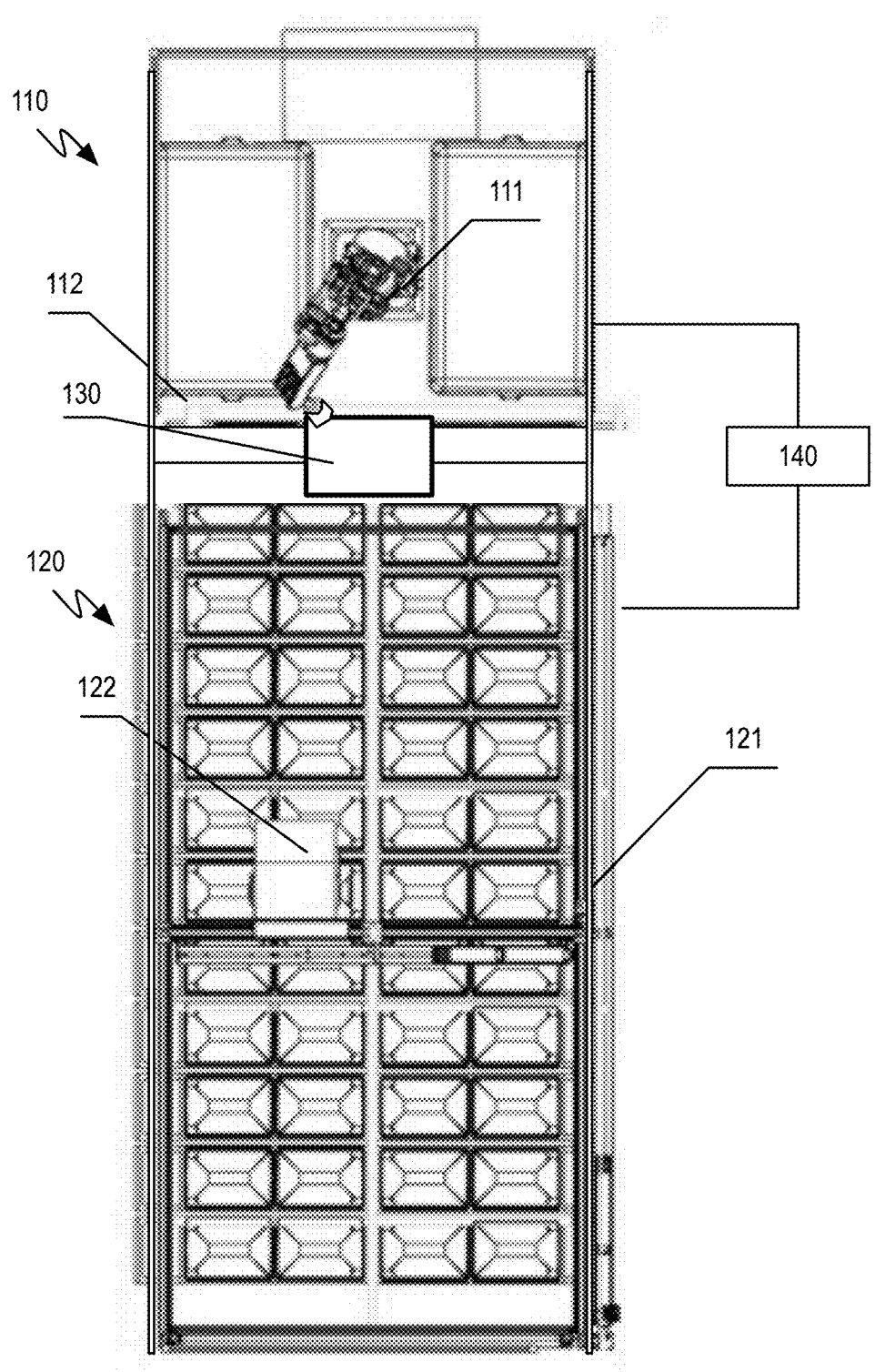
FIG. 3 is a schematic of a top view of a variation of the system with a transfer system.

The item selection unit 110 and the item sortation unit 120 are preferably adjacently arranged with reachable regions of the robotic pick-and-place machine 111 and the secondary sortation mechanism 122 having partially overlapping regions of reach such that objects may be transferred between as shown in FIG. 2. However, some variations may use an active or passive transfer system 130 for transferring items between the item selection unit 110 and the item sortation unit 120 as shown in FIG. 3.

The system and method may include a variety of different modular configurations. FIG. 2-8 show a few exemplary variations of how the system may be configured.

Figure 4:
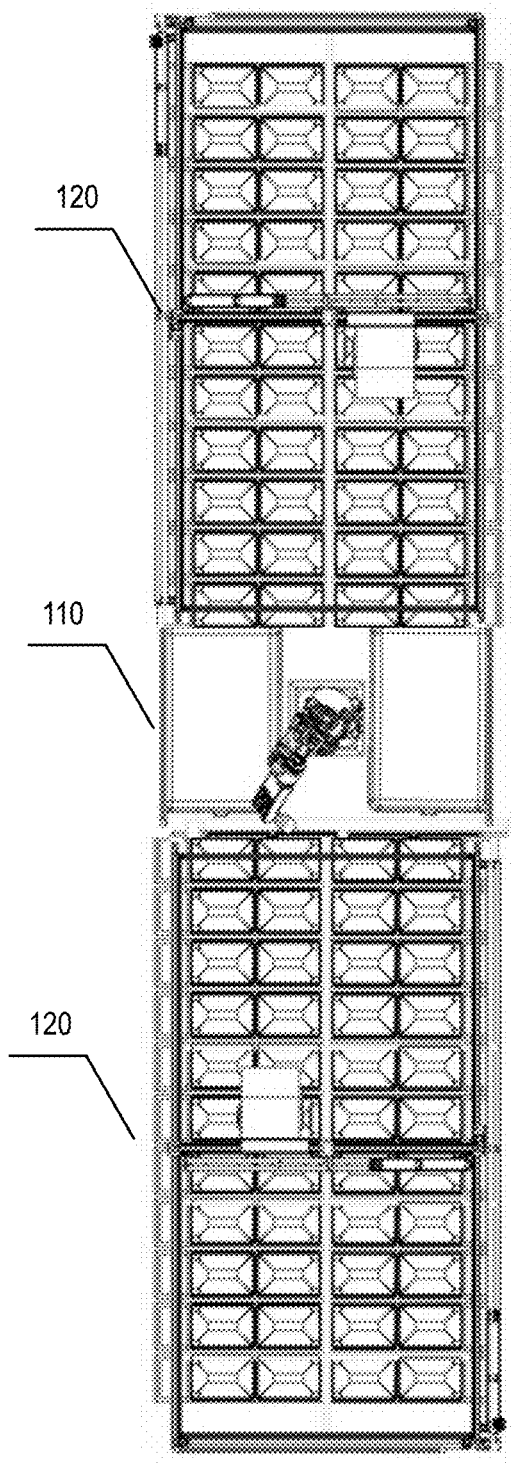
FIG. 4 is a schematic of a top view of a system variation where an item selection unit interfaces with multiple item sortation units.

As shown in FIG. 4, the item selection unit 110 may be configured to have two or more reachable regions used for transferring items to an item sortation unit 120. In one variation, this can include the item selection unit 110 using one of two reachable regions where a first reachable region overlaps with a reachable region of a first item sortation unit 120 and a second reachable region overlaps with a reachable region of a second item sortation unit 120. These reachable regions may be on defined around different positions around the robotic pick-and-place machine 111 such as on opposing sides. In another variation, the system may include two transfer systems 130 at different positions around the robotic pick-and-place machine as shown in FIG. 4.

Figure 5:
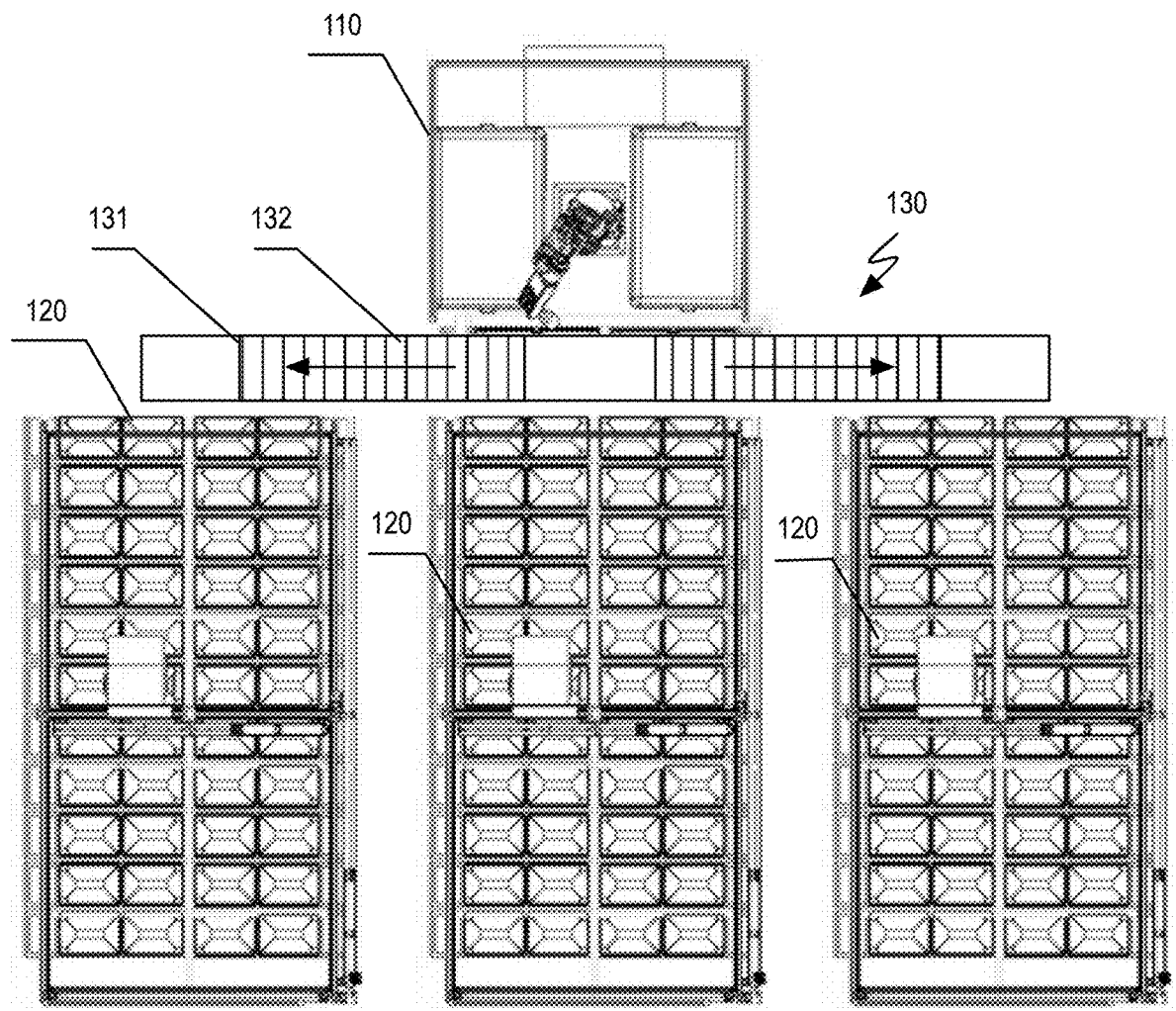
FIG. 5 is a schematic of a top view of a system variation where an item selection unit and multiple item sortation units coupled through a connecting conveyor system.

As shown in FIG. 5, a transfer system 130 that includes an intermediary conveyor system may facilitate integration of an item selection unit 110 and an item sortation unit 120. This may be used so that one item selection unit 110 can interface with multiple item sortation units 120 in a way where the reachable region of the robotic pick-and-place machine 111 does not directly overlap with a reachable region of the item sortation unit 120—the transfer system 130 can actively bridge this separation of reachable regions. More specifically, the transfer system 130 includes intermediary conveyor system 132 with one or more conveyors for transporting items to one or more handoff stations (i.e., transfer trays 131) of one of a set of item sortation units 120. The intermediary conveyor system can include an initial region reachable by the robotic pick-and-place machine 111 and that conveys items to a handoff station for transfer to one item sortation unit 120 of the set of item sortation units 120.

Figure 6:
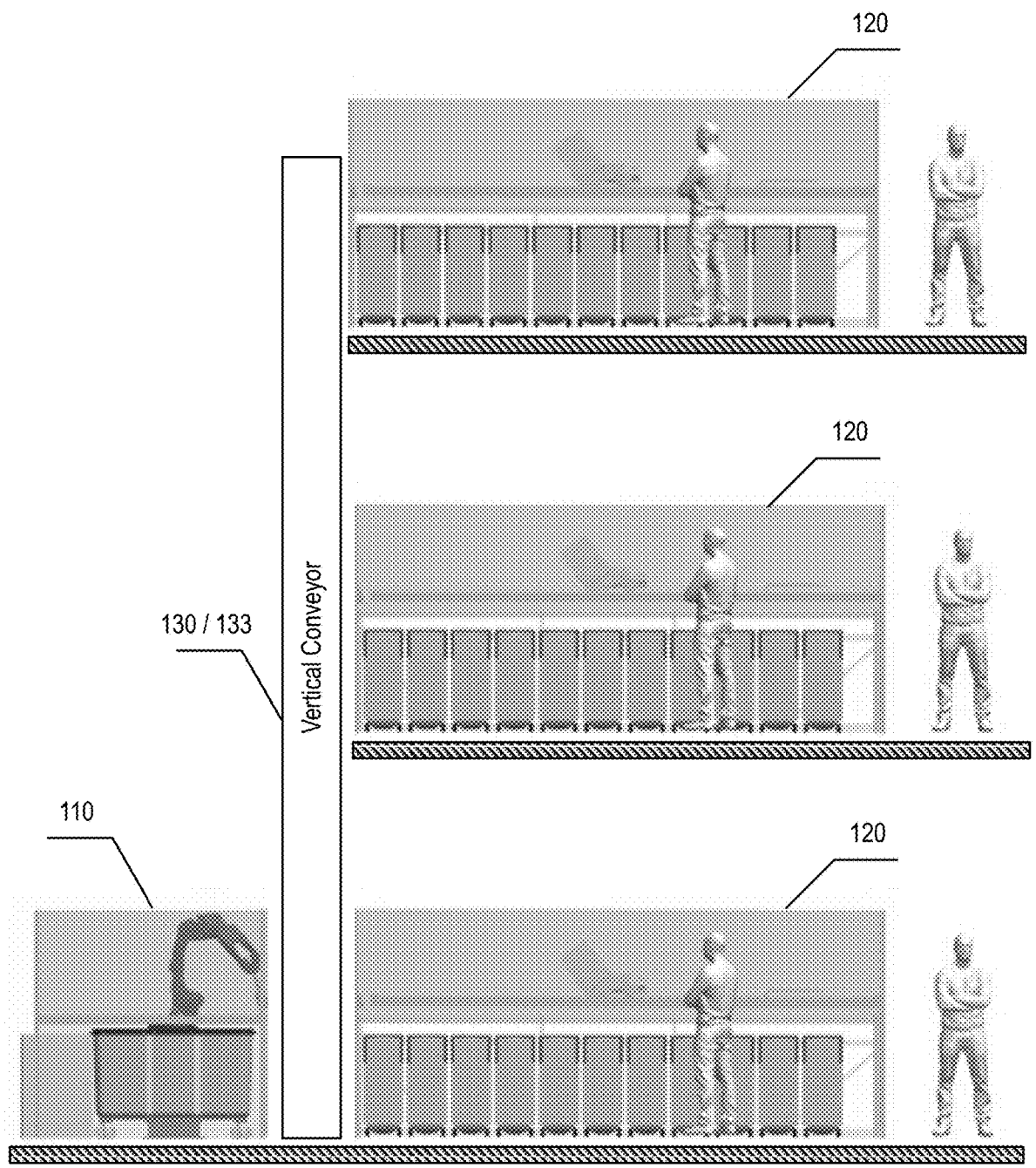
FIG. 6 is a schematic of a side view of a system variation with a vertical conveyor to distribute items vertically to different item sortation units.

As shown in FIG. 6, in another variation multiple sortation units 120 could also be stacked vertically where a transfer system includes a vertical intermediary conveyor system that moves a picked item to another level where it is sorted by one of a set of item sortation units 120. More specifically, the transfer system 130 includes intermediary vertical conveyor system 133 with one or more conveyors for transporting items to one of a set of item sortation units 120. Handoff stations may be used. Alternatively, the vertical conveyor system 133 may hold the item at an appropriate position for transferring.

Figure 7:
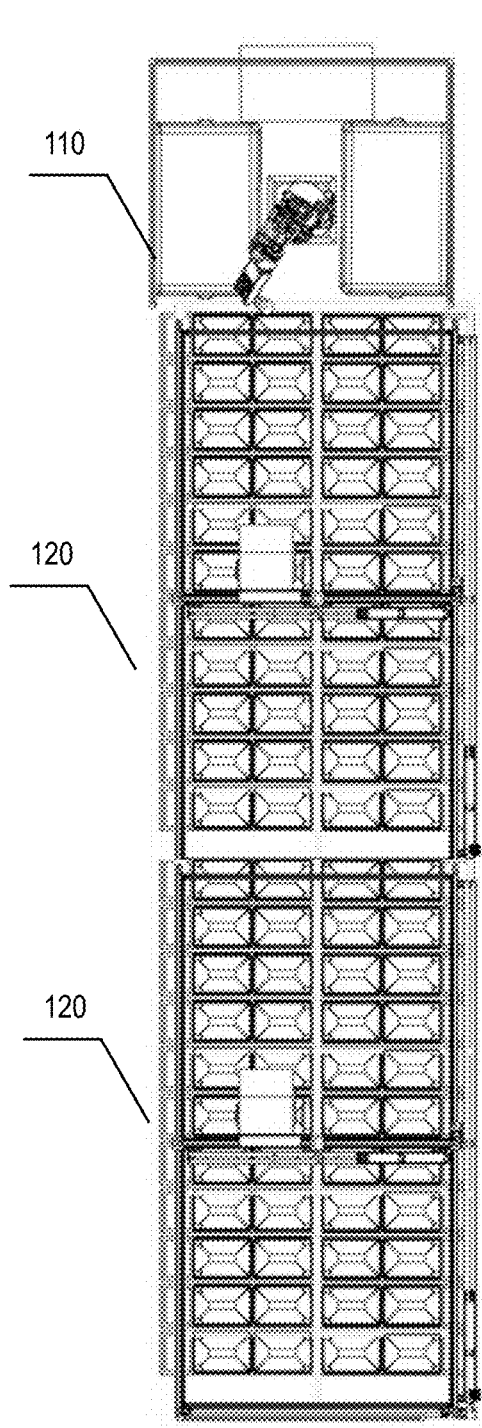
FIG. 7 is a schematic of a top view of a system variation with two item sortation units operably integrated.

As shown in FIG. 7, multiple sortation units 120 could interface with each other to expand the number of sorting groups. The item sortation units 120 may include an item holding and depositing system that is positionable for transfer of a held item to an adjacent item sortation unit 120. More specifically, a first horizontal translations system 121 (of a first item sortation unit 120) may have a first item holding and depositing system 122 positionable to a sortation transfer position; and a second horizontal translations system 121 (of a second item sortation unit 120) may have a second item holding and depositing system 122 positionable to the sortation transfer position as well. Accordingly, the sortation transfer position can be one that is a reachable region of the first item sortation unit 120 and the second item sortation unit 120, and more specifically, one where the first item holding and depositing system 122 can deposit a held item into the second item holding and depositing system 122.

Figure 8:
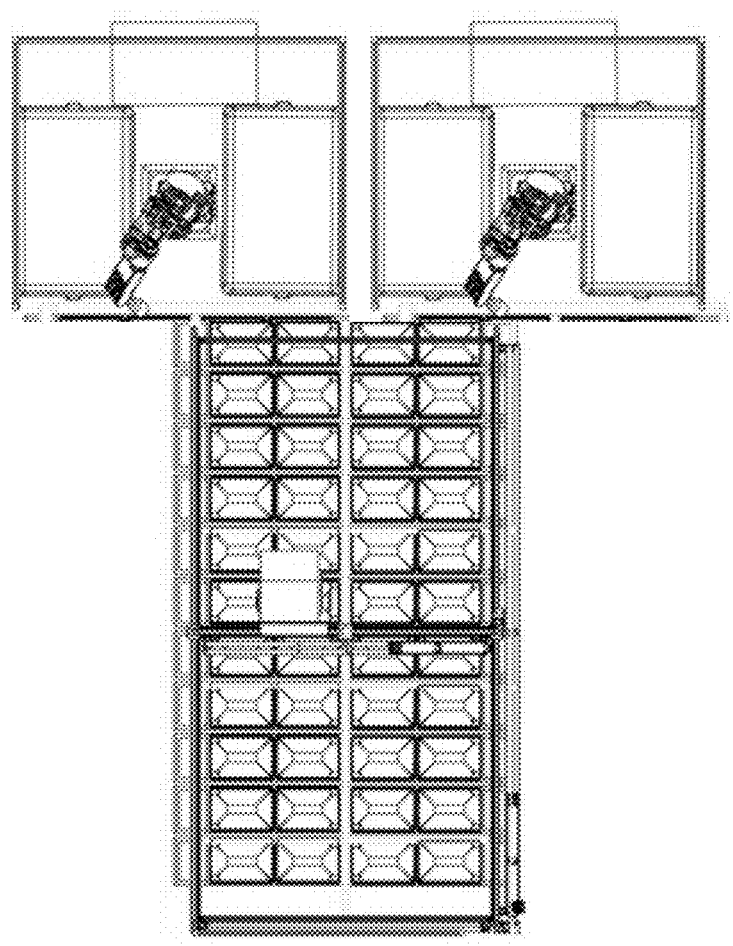
FIG. 8 is a schematic of a top view of a system variation with multiple item selection units operably integrated with a shared item sortation unit.

As shown in FIG. 8, as another configuration variation, multiple item selection units 110 may be used in combination with one item sortation unit 120. In one variation, each item selection unit may have a reachable region overlapping with a reachable region of the item sortation unit 120. The item selection units 110 may be adjacent on the same side of an item sortation unit 120. The item selection units 110 may alternatively be on different sites of an item sortation unit 120 where the item holding and depositing system 122 can be adapted to retrieve from different sides. In another variation, a transfer system 130 may make use of a conveyor system or other means for item transport between two regions (e.g., a chute or ramp) to bridge the reachable region of one or more of the item selection units 110 to the item sortation unit 120.

Herein, the system is primarily described as it would be implemented when one item selection unit 110 interfaces with one item sortation unit 120. One variation includes the item selection unit 110 directly interfacing with one item sortation unit 120. Another variation includes the item selection unit 110 indirectly interfacing with the item sortation unit 120 through a transfer system 130 (e.g., the item selection unit 110 place an item at the transfer system 130, and the item sortation unit collects the item from the transfer system 130). The variations described herein are in no way limited to being applied to such configuration and as could be appreciated by one skilled in the art, the variations could be applied to other configurations and implementations of the system.

The item selection unit 110 functions as a modular system for the selection of items from an unorganized collection. As described, the item selection can include one or more robotic pick-and-place machines 111 that select from one or more input item regions 112 that are preferably implemented as item bins. The item selection unit 110 preferably includes or is in communication with a control system 140 comprising one or more computer processors and one or more computer readable mediums (e.g., non-transitory computer-readable mediums) storing instructions that, when executed by the one or more computer processors, cause the item selection unit 110 to grasp an item, optionally perform any item processing (e.g., scanning an barcode), and translate and orient the grasped item into position for transfer to the item sortation unit 120.

The robotic pick-and-place machine 111 functions as the automated system used to interact with an item and move the item from the input item region 112 to a region for transferring to the item sortation unit 120.

The robotic pick-and-place machine 111 preferably includes an actuation system and an end effector used to temporarily physically couple (e.g., grasp or attach) to an item and perform some manipulation of that item. The actuation system is used to move the end effector and, when coupled to one or more items (e.g., grasping the item), move and orient an item in space. Preferably, the robotic pick-and-place machine 111 is used to pick up an item, manipulate the item (move and/or reorient and item), and then place an item when done. Placement of an item may additionally include orienting and placing the item in a particular position and orientation for appropriate positioning within the item holding and depositing system 122. In another variation placement of an item may include orienting and placing the item in a transfer system 130 for appropriate positioning when transferred to an item holding and depositing system 122.

The robotic pick-and-place machine 111 may additionally facilitate other item related tasks such as scanning a barcode or identifier on the item or performing any suitable task. In one variation, the robotic pick-and-place machine 111 can scan a grasped item for identifying the item. A detected item identifier may be used in determining the end output tote in which the item can be deposited by the item holding and depositing system 122. As an additional or alternative variation, the robotic pick-and-place machine 111 can use a dimensional camera or other sensor system for dimensioning the item. Dimensioning can include determining spatial characteristics of the item (i.e., item dimensions). In one implementation the item dimensions can include defining a bounding volume of the item (e.g., a width, height, and depth of the item). The item dimensions may be used at least in part in planning placement orientation when placing an item within the transfer system 130 and/or the item holding and depositing system 122. This can include modeling depositing of the item into an item tote based on the item dimensions and selecting a transfer position with satisfactory modeled results.

Herein, the robotic pick-and-place machine 111 may be more concisely referred to as the robotic system 111. A variety of robotic systems 111 may be used. In one preferred implementation, the robotic system 111 is an articulated arm using a pressure-based suction-cup end effector. The robotic system 111 may include a variety of features or designs.

The actuation system functions to translate the end effector through space. The actuation system will preferably move the end effector to various locations for interaction with various items. The actuation system may additionally or alternatively be used in moving the end effector and grasped item(s) along a particular path, orienting the end effector and/or grasped item(s), and/or providing any suitable manipulation of the end effector. In general, the actuation system is used for gross movement of the end effector.

The actuation system may be one of a variety of types of machines used to promote movement of the end effector. In one preferred variation, the actuation system is a robotic articulated arm that includes multiple actuated degrees of freedom coupled through interconnected arm segments. One preferred variation of an actuated robotic arm is a 6-axis robotic arm that includes six degrees of freedom. The actuation system may alternatively be a robotic arm with fewer degrees of freedom such as a 4-axis or 5-axis robotic arm or ones with additional articulated degrees of freedom such as a 7-axis robotic arm.

In other variations, the actuation system may be any variety of robotic systems 111 such as a Cartesian robot, a cylindrical robot, a spherical robot, a SCARA robot, a parallel robot such as a delta robot, and/or any other variation of a robotic system 111 for controlled actuation.

The actuation system preferably includes an end arm segment. The end arm segment is preferably a rigid structure extending from the last actuated degree of freedom of the actuation system. In an articulated robot arm, the last arm segment couples to the end effector. As described below, the end of the end arm segment can include a head selector that is part of a changeable end effector system.

In one variation, the end arm segment may additionally include or connect to at least one compliant joint, which may improve the grasping and dexterity of the robotic system 111.

The compliant joint functions as at least one additional degree of freedom that is preferably positioned near the end effector. The compliant joint is preferably positioned at the distal end of the end arm segment of the actuation system, wherein the compliant joint can function as a "wrist" joint. The compliant joint preferably provides a supplementary amount of dexterity near where the end effector interacts with an item, which can be useful during various situations when interacting with items.

In a multi-tool changing variation of the system, the compliant joint preferably precedes the head selector component such that each attachable end effector head can be used with controllable compliance. Alternatively, one or more multiple end effectors may have a compliant joint.

In a multi-headed tool variation, a compliant joint may be integrated into a shared attachment point of the multi-headed end effector. In this way, use of the connected end effectors can share a common degree of freedom at the compliant joint. Alternatively, one or more multiple end effectors of the multi-headed end effector may include a compliant joint. In this way, each individual end effector can have independent compliance.

The compliant joint is preferably a controllably compliant joint wherein the joint may be selectively made to move in an at least partially compliant manner. When moving in a compliant manner, the compliant joint can preferably actuate in response to external forces. Preferably, the compliant joint has a controllable rotational degree of freedom such that the compliant joint can rotate in response to external forces. The compliant joint can additionally preferably be selectively made to actuate in a controlled manner. In one preferred variation, the controllably compliant joint has one rotational degree of freedom that when engaged in a compliant mode rotates freely (at least within some angular range) and when engaged in a controlled mode can be actuated so as to rotate in a controlled manner. Compliant linear actuation may additionally or alternatively be designed into a compliant joint. The compliant joint may additionally or alternatively be controlled for a variable or partially compliant form of actuation, wherein the compliant joint can be actuated but is compliant to forces above a particular threshold.

The end effector functions to facilitate direct interaction with an item. Preferably, the system is used for grasping an item, wherein grasping describes physically coupling with an item for physical manipulation. Controllable grasping preferably enables the end effector to selectively connect/couple with an item ("grasp" or "pick") and to selectively disconnect/decouple from an item ("drop" or "place"). The end effector may controllably "grasp" an item through suction force, pinching the item, applying a magnetic field, and/or through any suit force. Herein, the system is primarily described for suction-based grasping of the item, but the variations described herein are not necessarily limited to suction-based end effectors.

In one preferred variation, the end effector includes a suction end effector head (which may be more concisely referred to as a suction head) connected to a pressure system. A suction head preferably includes one or more suction cups. The suction cups can come in variety of sizes, stiffnesses, shapes, and other configurations. Some examples of suction head configurations can include a single suction cup configuration, a four suction cup configuration, and/or other variations. The sizes, materials, geometry of the suction heads can also be changed to target different applications. The pressure system will generally include at least one vacuum pump connected to a suction head through one or more hoses.

Figure 9:
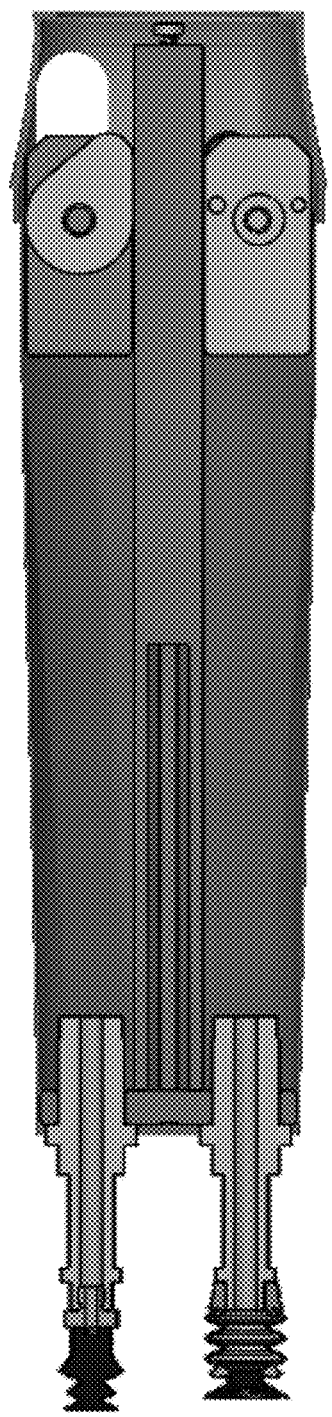
FIG. 9 is a detailed schematic representation of a first variation of the system with multiple selectable end effectors.
Figure 10:
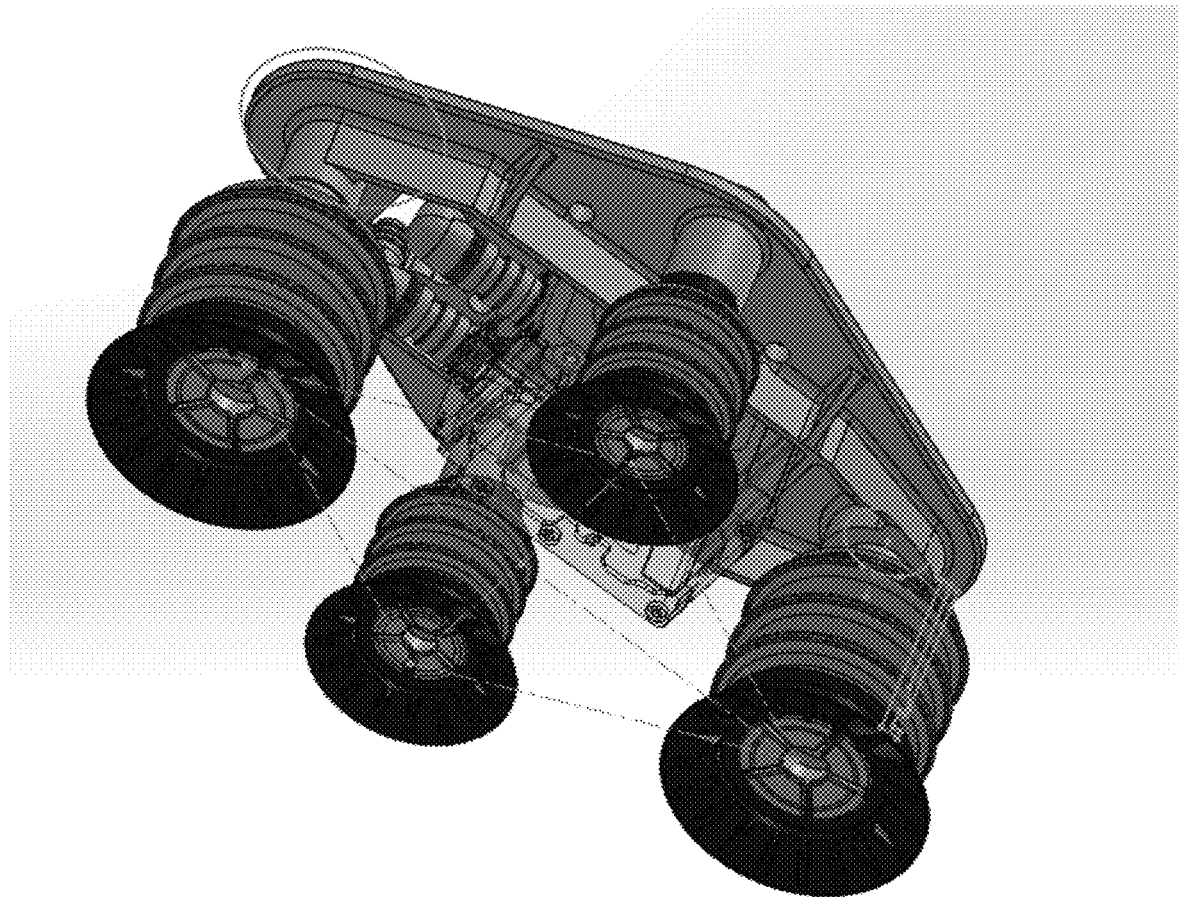
FIG. 10 is a detailed schematic representation of a second variation of the system with multiple selectable end effectors.

In one preferred variation, the end effector of the system includes a multi-headed end effector tool that includes multiple selectable end effector heads as shown in exemplary variations FIG. 9 and FIG. 10. Each end effector head can be connected to individually controlled pressure systems. The system may selectably activate one or multiple pressure systems to grasp using one or multiple end effectors of the multi-headed end effector tool. The end effector heads may be selected and used based on dynamic control input from the grasp planning model. The pressure system(s) may alternatively use controllable valves to redirect airflow. Alternatively, all or a subset of the end effector heads could be connected to a shared pressure system. Two or more end effector heads may be activated simultaneously, and an item may be grasped by one or more of the end effector heads. The different end effectors are preferably spaced apart. They may be angled in substantially the same direction, but the end effectors may alternatively be directed outwardly in non-parallel directions from the end arm segment.

As shown in the cross-sectional view of FIG. 9, one exemplary variation of a multi-headed end effector tool can be a two-headed gripper. This variation may be specialized to reach within corners of deep bins or containers and pick up small items (e.g., small items like a pencil) as well as larger items (such as boxes). In one variation, each of the gripping head end effectors may be able to slide linearly on a spring mechanism. The end effector heads may be coupled to hoses that connect to the pressure system(s). The hoses can coil helically around the center shaft (to allow for movement) to connect the suction heads to the vacuum generators.

As shown in FIG. 10, another exemplary variation of a multi-headed end effector tool can be a multi four-headed gripper. As shown in this variation, various sensors such as a camera or barcode reader can be integrated into the multi-headed end effector tool, shown here in the palm. Suction cup end effector heads can be selected to have a collectively broad application (e.g., one for small boxes, one for large boxes, one for loose polybags, one for stiffer polybags). The combination of multiple grippers can pick items of different sizes. In some variations, this multi-headed end effector tool may be connected to the robot by a spring plunger to allow for error in positioning.

In another preferred variation of the system includes a changeable end effector system, which functions to enable the end effector to be changed. A changeable end effector system preferably includes a head selector, which is integrated into the distal end of the actuation system (e.g., the end arm segment), a set of end effector heads, and a head holding device. The end effector heads are preferably selected and used based on dynamic control input from the grasp planning model. The head selector and an end effector head preferably attach together at an attachment site of the selector and the head. One or more end effector head can be stored in the head holding device when not in and use. The head holding device can additionally orient the stored end effector heads during storage for easier selection. The head holding device may additionally partially restrict motion of an end effector head in at least one direction to facilitate attachment or detachment from the head selector.

The head selector system functions to selectably attach and detach to a plurality of end effector heads. The end effector head functions as the physical site for engaging with an item. The end effectors can be specifically configured for different situations. In some variations, a head selector system may be used in combination with a multi-headed end effector tool. For example, one or multiple end effector heads may be detachable and changed through the head selector system.

The changeable end effector system may use a variety of designs in enabling the end effectors to be changed. In one variation, the changeable end effector is a passive variation wherein end effector heads are attached and detached to the robotic system 111 without use of a controlled mechanism. In a passive variation, the actuation and/or air pressure control capabilities of the robotic system 111 may be used to engage and disengage different end effector heads. Static magnets, physical fixtures (threads, indexing/alignment structures, friction-fit or snap-fit fixtures) and/or other static mechanism may also be used to temporarily attach an end effector head and a head selector.

In another variation, the changeable end effector is an active system that uses some activated mechanism (e.g., mechanical, electromechanical, electromagnetic, etc.) to engage and disengage with a selected end effector head. Herein, a passive variation is primarily used in the description, but the variations of the system and method may similarly be used with an active or alternative variation.

Figure 11:
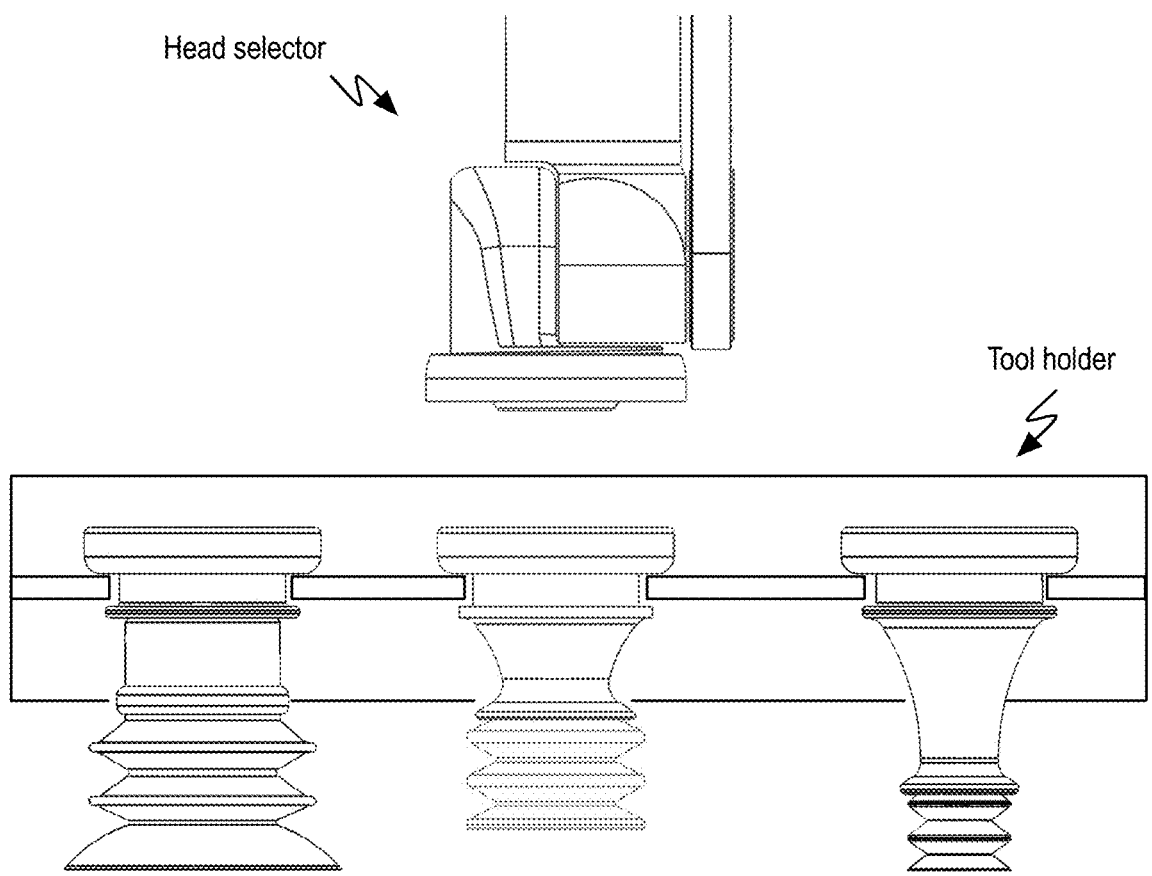
FIG. 11 is a detailed schematic representation of a changeable end effector system.

One preferred variation of the changeable end effector system is designed for use with a robotic system 111 using a pressure system with suction head end effectors. The head selector can further function to channel the pressure to the end effector head. The head selector can include a defined internal through-hole so that the pressure system is coupled to the end effector head. The end effector heads will generally be suction heads. A set of suction end effector heads can have a variety of designs as shown in FIG. 11.

The head selector and/or the end effector heads may include a seal element circumscribing the defined through-hole. The seal can enable the pressure system to reinforce the attachment of the head selector and an end effector head. This force will be activated when the end effector is used to pick up an item and should help the end effector head stay attached when loaded with an outside item.

The robotic system 111 preferably includes a grasp planning and control system to manage the robotic control of the robotic system 111. Machine learning models can be used in planning grasps that are used in selecting grasp locations for items in the input item region 112 that map to locations with higher confidence of grasping success, grasping in a location with higher confidence of successful item translation and orientation (e.g., minimizing moment arm of item when grasped), higher confidence in not grasping in a location that prevents item identification (e.g., not grasping in a region of item that blocks a barcode), and/or other aspects impacting successful completion of the tasks of the item selection unit 110.

The input item region 112 functions to hold items prior to sorting. In a preferred variation, the input item region 112 includes one or more input item bins that contain unsorted items. The item bins can be placed adjacent to the robotic system 111 and are preferably within the reachable range of the robotic system 111. In one implementation, input item region 112 is a defined space in which item bins may be inserted and removed. In this way, a worker, conveyor system, or a robotic system may move an item bin into position and optionally remove empty (or otherwise finished) item bins.

Items and/or item bins may be moved through or added to the input item region using a conveyor, a chute, an autonomous mobile robot, or using any suitable mechanism. In one variation, the system is coupled to an item processing system whereby an item input conveyor moves items from some source into the input item region 112. In one variation, the item input may be supplied without item identification and so the system can facilitate determining an item identifier (or some other property) that can be used in selecting a destination output tote for the item. In another variation, item input may be configured such that one or more items may be supplied such that an item identifier (or property) is known when grasped by the robotic system 111 and thereby a destination output tote may be associated with the item prior to grasping. In such a variation, the order of item selection by the item selection unit 110 may factor in the capacity levels of output totes such that an item is grasped for sortation when a destination output tote has capacity to receive the item.

The item selection unit 110 preferably includes a sensing system 113. The sensing system 113 function to collect data of the objects and the environment. The sensing system 113 preferably includes an imaging system, which functions to collect image data. The imaging system can include at least one imaging device with a field of view of a region of interest that covers preferably the input item region 112 and optionally a region where the item is transferred to the item sortation unit 120. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used.

The sensing system 113 may collect data that is communicated to the control system 140 to facilitate item grasp planning. For example, image data of a collection of items in the input item region 112 can be processed by an analysis model that outputs one or more grasp plans (e.g., points for item selection, or motion plans for approaching, grasping, and picking up an item).

The sensing system 113 may additionally or alternatively include one or more sensors for item identification. This could include a sensor for scanning a barcode and/or a RFID tag reader. In one exemplary implementation, the system may include 4 barcode scanners: two side scanners, one top scanner, and a bottom scanner. The two side barcode scanners can capture barcodes on the sides of items while rotating the item. The top scanner can capture barcodes from up top such as after item placement in a transfer tray or the item tray. The bottom scanner can capture barcodes from below as the item is removed from the item bin. A transparent shield can be placed above the bottom scanner so that if an item is dropped it will deflect off the shield. Any suitable sensing system may be used for collecting information of an item that can be used to determining a destination output tote.

The sensing system 113 may additionally or alternatively include one or more sensors for item dimensioning. The sensing system 113 could include one or more dimensional camera (e.g., a depth sensor) or other sensor system for dimensioning the item. Dimensioning can include determining spatial characteristics of the item (i.e., item dimensions). In one implementation the item dimensions can include defining a bounding volume of the item (e.g., a width, height, and depth of the item). The item dimensions may be used at least in part in planning placement orientation when placing an item within the transfer system 130 and/or the item holding and depositing system 122.

Other sensors such as load cells, proximity sensors, RFID tracking systems, and the like may also be used to monitor status of various aspects of the system.

The item selection unit 110 may additionally include other supplementary systems that can be used to facilitate other forms of item processing. For example, the item selection unit 110 can include a label printer and applicator, which function to enable labels to be produced and applied to an item prior to sortation.

The item sortation unit 120 functions to receive a selected item from the item selection unit 110 and translate it to one of an array of item totes. The item sortation unit collects an item directly or indirectly from the item selection unit 110. The item sortation unit translates the dynamic and adaptive item singulation and grasping capabilities of the item selection unit 110 into scalable sorting into many output groupings. The item sortation unit 120 operates in cooperation with one or more item selection units 110. In some instances, a transfer system 130 is used as an intermediary component that temporarily holds and optionally transports the item after placement by the items election unit 110 and collection by the item sortation unit 120.

In a preferred variation, the item sortation unit 120 includes a gantry system 121 with an item holding and depositing system 122 that performs grouping across a horizontally distributed output tote array 123. As discussed, some configuration variations may enable vertical distribution of output tote arrays 123.

The item sortation unit 120 preferably includes or is in communication with a control system 130 comprising of one or more computer readable mediums (e.g., non-transitory computer-readable mediums) storing instructions that, when executed by one or more computer processors, cause the item sortation unit 120 to position the item holding and depositing system 122 into a position for receiving a transferred item from the item selection unit 110, moving the item holding and depositing system 122 into position above a targeted output item tote, and depositing the item into the targeted output item tote. An output tote capacity sensor 124 may additionally sense current capacity levels of one or more output item totes.

In a single item sortation unit 120 variation, all output item totes (which define the number of item groupings) are accessible by the item sortation unit 120.

In some applications, the decision to add item sortation units may be based on the desired number of output groupings and the item handling speed of the item selection unit and the item sortation units. In one optimized implementation, the item selection processing time of the item selection unit (e.g., the time for grasping of an item, processing the item such as barcode scanning, and orienting the item for transfer) and the item sorting processing time of the item sortation unit (e.g., the time for receiving an item, moving into position, and depositing the item) are substantially equal. Item type, size and weight variations may impact grasp success rates and how quickly an item can be moved, and so processing time may vary between different items.

In some variations, multiple item sortation units may be coupled to expand the number of groupings. This may be used to keep item sorting processing time close to the item selection processing time to reduce waiting time of any one unit. In one variation, a vertical degree of freedom may be used to translate a selected item between different vertically arranged item sortation units 120. In another variation, item selection units 120 may be coupled so that items can be transferred between them.

The gantry system 121 functions as an actuation system used for sorting. The gantry system 121 can be a horizontal gantry system that is actuated with at least two (linear) degrees of freedom. In this way, the horizontal gantry system can translate the item holding and depositing system 122 (and thereby a held item) across a 2D area. In one implementation, the horizontal gantry system is a 2-axis linear actuator comprised of two coupled linear actuators that are perpendicularly arranged as shown in FIGS. 1A and 1B. Various other approaches to actuation may alternatively be used. In some variations, the horizontal gantry system 121 may actuate along one degree of freedom if the output tote array is a linear array of item totes.

Herein, the gantry system 121 is described as a horizontal gantry system, but the gantry system 121 may alternatively be a vertical gantry system. A vertical gantry system could function sort items across a wall of output totes. In yet another variation, the gantry system 121 may include three linear degrees of freedom to allow sortation into a 3D array of output totes 123.

The gantry system 121 preferably includes the item holding and depositing system 122 that is coupled to the actuation system of the gantry system 121 such that it can be moved into different positions. The item holding and depositing system 122 also serves as a mechanism for holding an item during positioning and then depositing the item into a targeted item tote. The item holding and depositing system 122 may be implemented through a variety of approaches-two variations include an actuated item tray and a second robotic pick and place machine.

Figure 12:
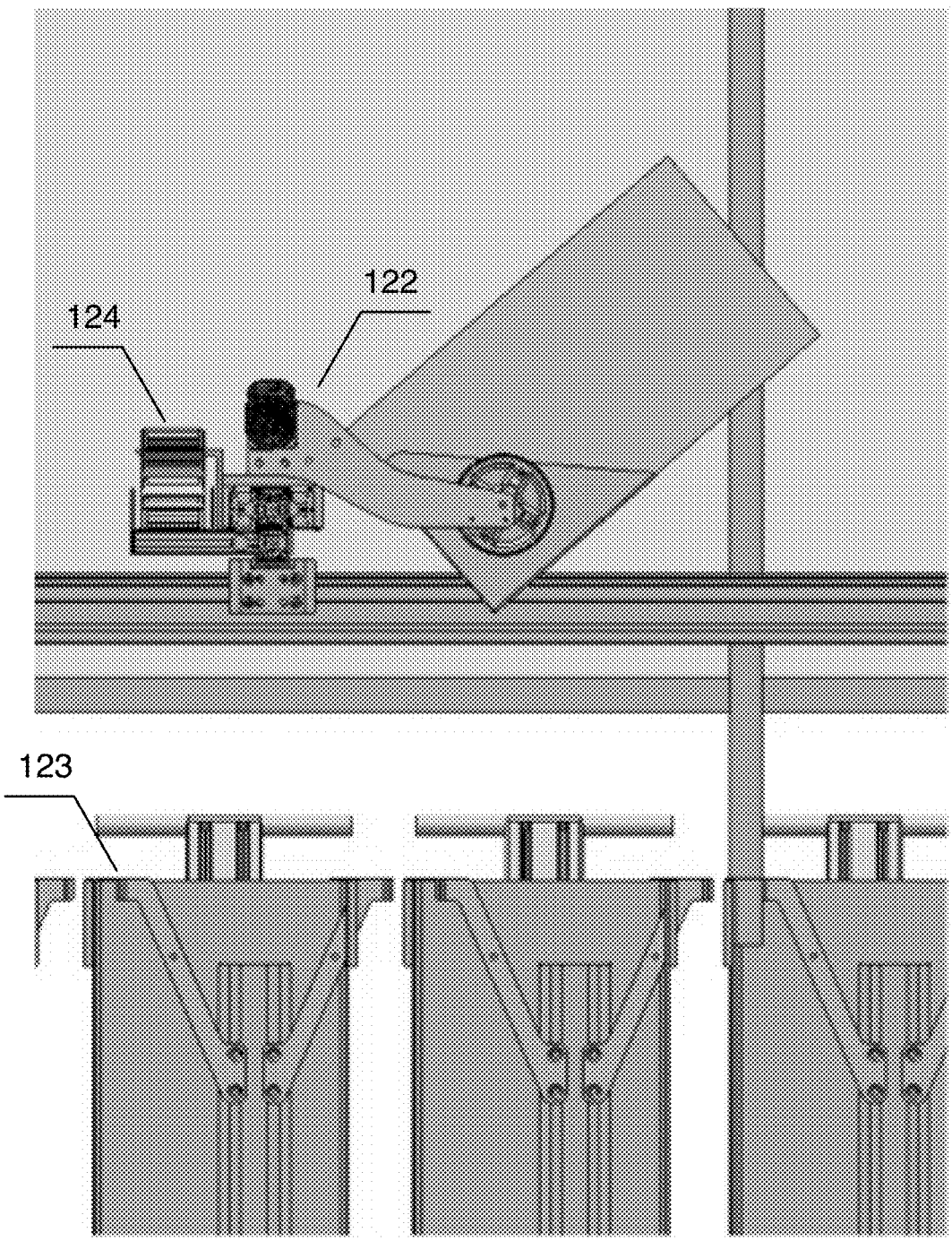
FIG. 12 is a schematic of a side view of an actuated tray variation of an item holding and depositing system.

A variation of an item holding and depositing system 122 can be an actuated item tray as shown in FIG. 12, which functions as an actuated surface or container that holds the item when receiving/collecting the item and when moving the item. The item holding and depositing system 122 can additionally function to controllably deposit the item into a targeted region.

The actuated item tray preferably includes an at least partial container and a depositing mechanism. In one preferred variation, the actuated item tray includes a rotationally articulated container. The container can include two intersecting surfaces with one defining a lip surface and a second defining a back surface. The two intersecting surfaces can form a trough in which objects can sit. The two surfaces could be perpendicular or at any suitable angle. The container may additionally include two side walls as shown in FIG. 12 or other side structures so as to form two adjacent corners of a tray. A box, letter, or other type of item could be placed within the container and rotated so as to stay within the container during translation, and then the container can be rotated so as to deposit the item. During motion, the container may be rotated upwards to mitigate chances of the item sliding out of the container when stopping, starting, or changing directions.

The item tray can have a defined receiving end, which is oriented toward the item selection unit 110. The item totes preferably have an opening defined to accommodate items deposited from the item tray. For example, the item totes have an opening with a width that is wider than the width of the item tray and a height that is sufficient to receive anticipated items. These dimensions may be configured within the system so as to inform the placement orientation of items when placed by the item selection unit 110.

Figure 13A:
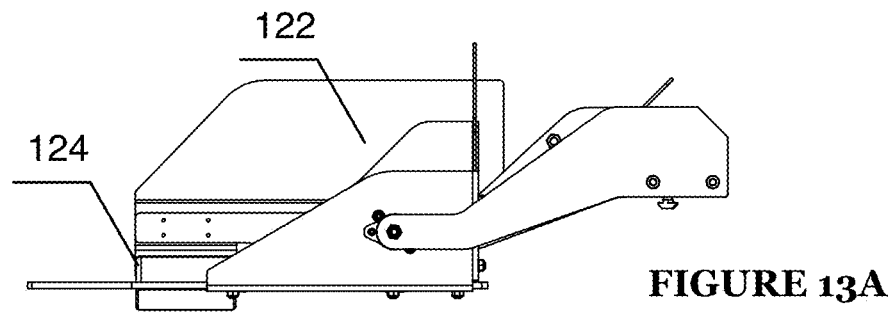
FIGS. 13A-13C are schematic representations of an item tray shown from the side in different actuation states.
Figure 13B:
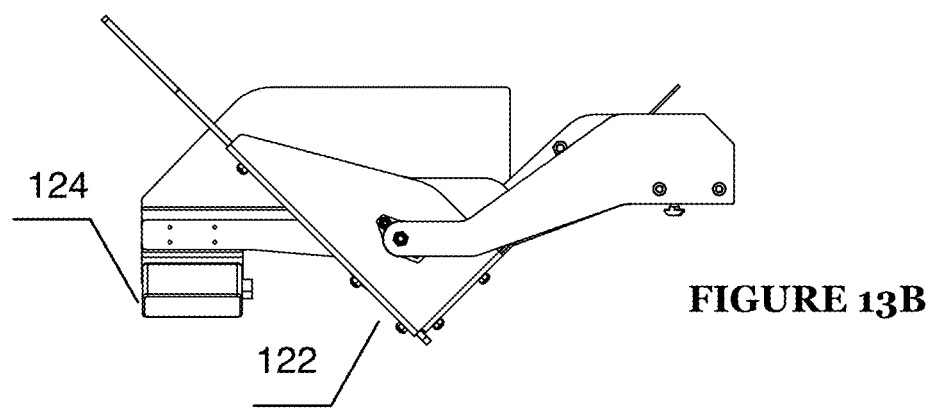
Figure 13C:
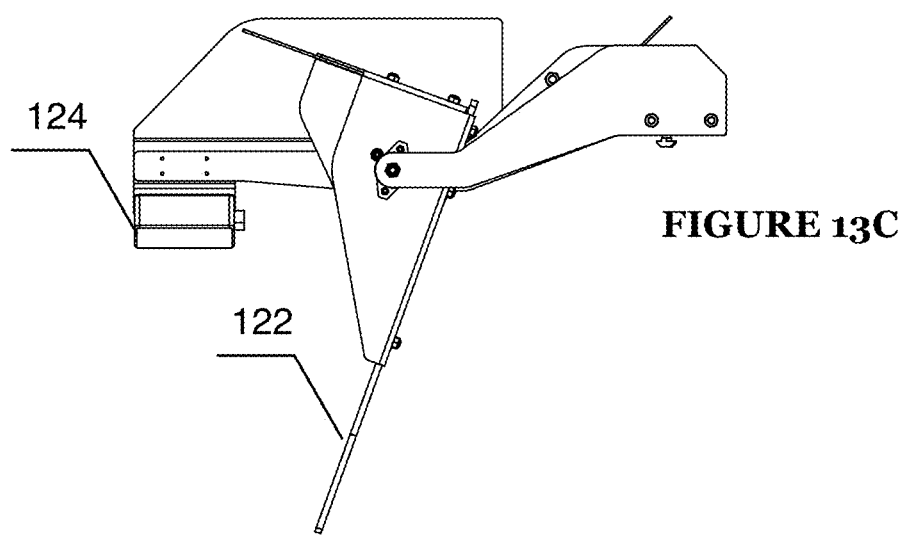

The rotationally articulated container can have a first actuation state with the container in a holding position and a second actuation state with the container angled into a depositing position. During transport the item tray is preferably in a holding position and can be titled with a concave portion of the item tray (defined by the wall surfaces of the item tray) at a lowered point (lower than the edges of the highest wall surfaces) so that a held item sits in the item tray. The side surfaces can prevent the item from sliding out during transport. In one exemplary variation shown in FIGS. 13A, 13B, and 13C, the rotationally articulated container can have a first actuation state that functions as an insertion state for receiving or retrieving an item from an item selection unit 110 as shown in the example of FIG. 13A; a second actuation state that functions as a carrying state for holding an item during transport by the gantry system 121 as shown in the example of FIG. 13B; and a third actuation state that functions as a depositing state for depositing an item into a targeted item tote as shown in the example of FIG. 13C.

Figure 14:
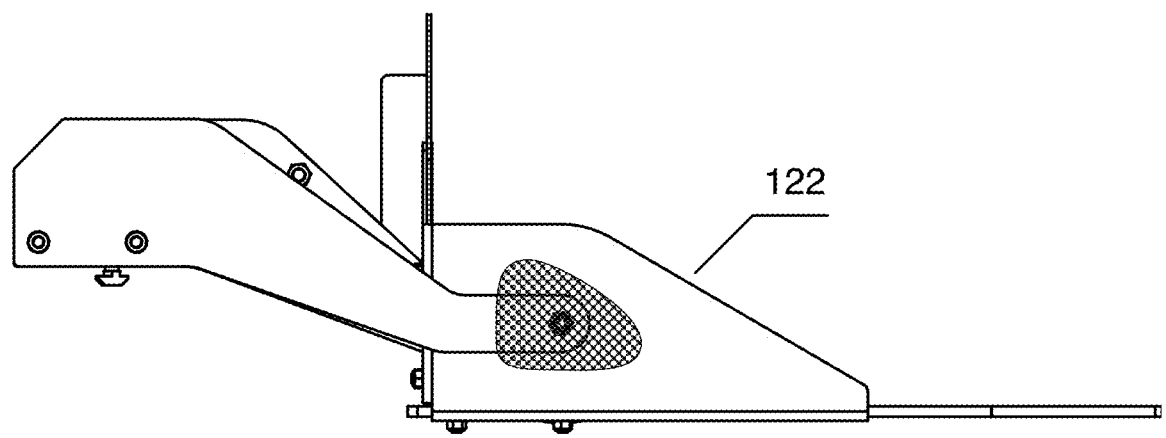
FIG. 14 is a representational side view of an item tray with a shaded region for potential rotational points.

The rotationally articulated container can have a rotation point that is defined so as to promote an item sliding out in a controlled manner into a targeted output location. The rotationally articulated container preferably has a rotation point that is defined within a central region of the sides of the container. The rotation point more specifically can be in the central region but ins a portion closer to the back wall compared to the tip (where the tip is where an item is slid out) as shown in the exemplary representational image of FIG. 14 where a shaded region is used to show potential locations of a rotational point in some implementations. As an alternative to a pivot point, the rotationally articulated container may rotate into a depositing position by rotating while the container is moved along a track or path.

Figure 15:
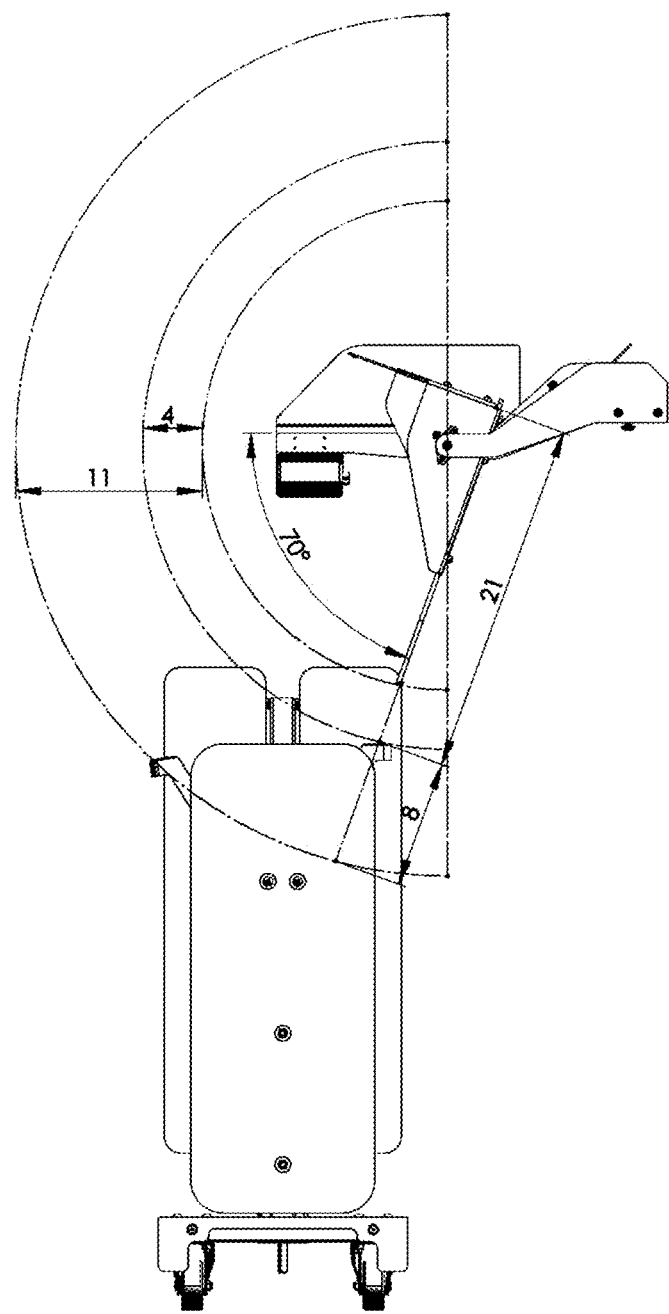
FIG. 15 is a schematic representation of a side view of an item tray in a depositing position above an item tote.

As shown in FIG. 15, the rotational point of the item tray may be configured and adjusted for an expected item tote size. the length of an extending arm (i.e., surface) of the item tray can be configured to have sufficient clearance when depositing. In this example, eight inches of clearance can be configured for the longest objects handled by the system. Similarly, the tilt angle can be configured for a reliable transfer from the item tray into an item tote. In this example, a seventy-degree angle is shown as in example of FIG. 15.

Figure 16A:
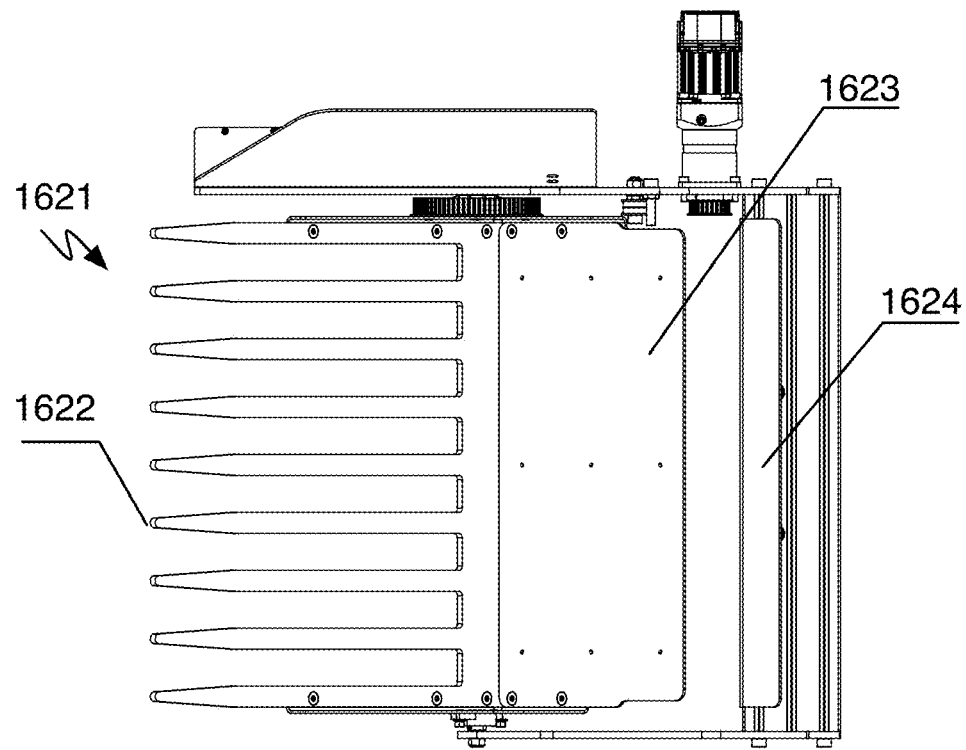
FIG. 16A is a schematic representation of a top view of an exemplary slotted item tray.
Figure 16B:
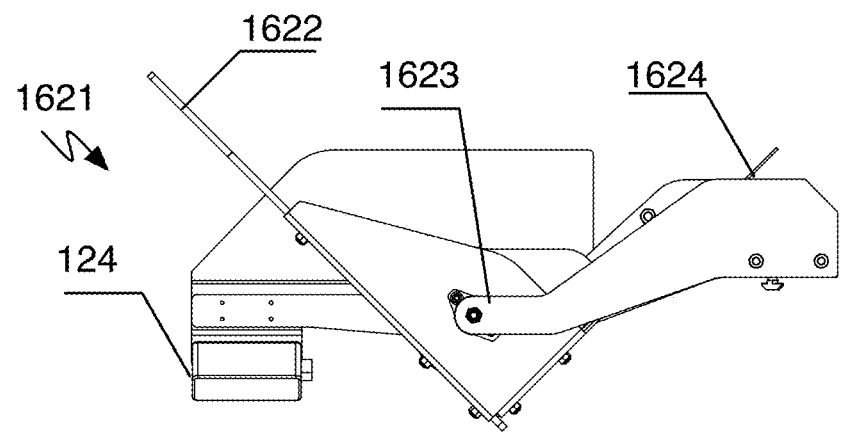
FIG. 16B is a schematic representation of a side view of an exemplary slotted item tray.
Figure 16C:
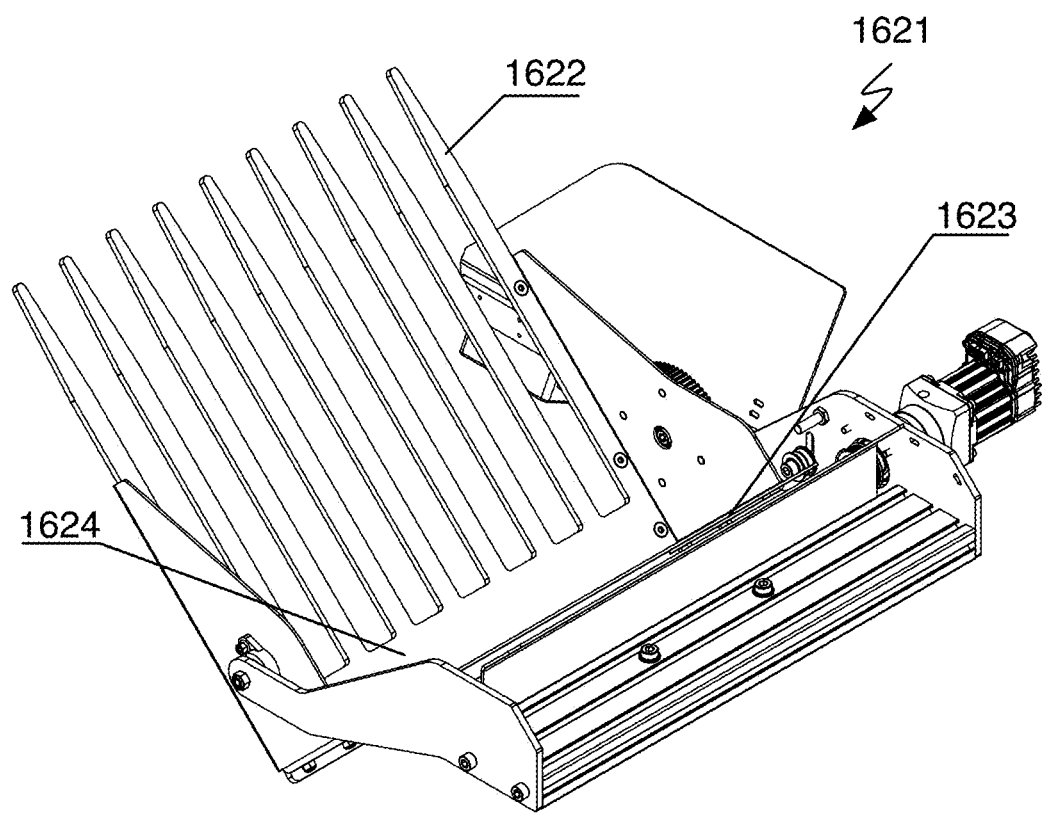
FIG. 16C is a schematic representation of a perspective view of an exemplary slotted item tray.
Figure 17A:
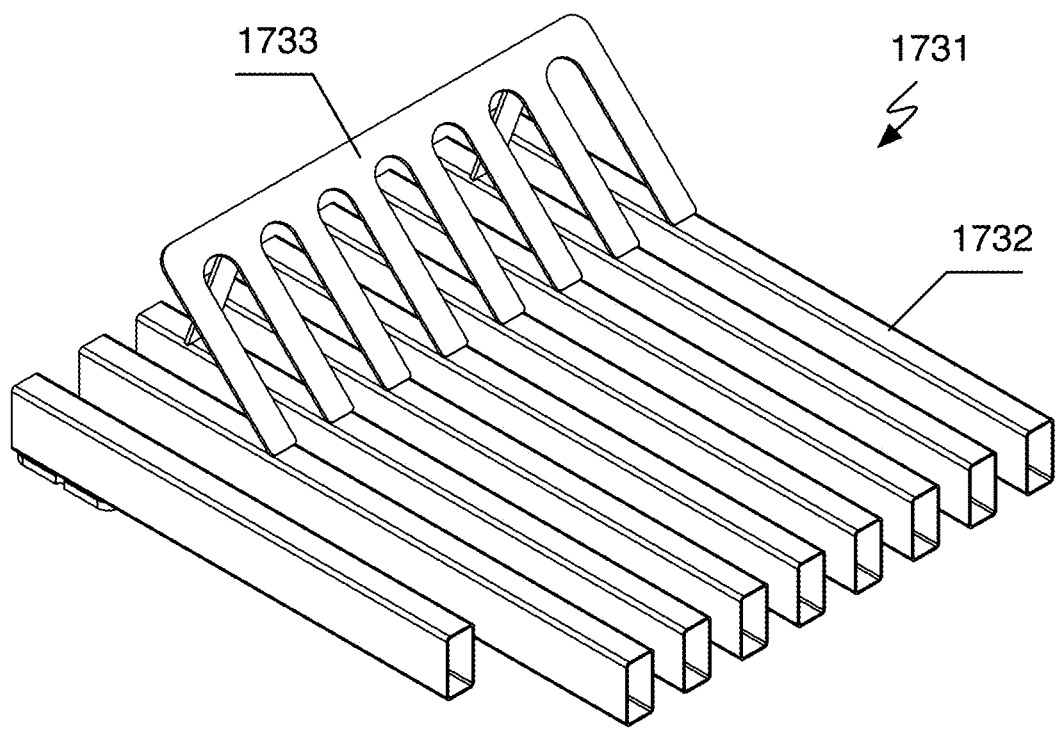
FIG. 17A is a schematic representation of a perspective view of an exemplary slotted transfer tray.
Figure 17B:
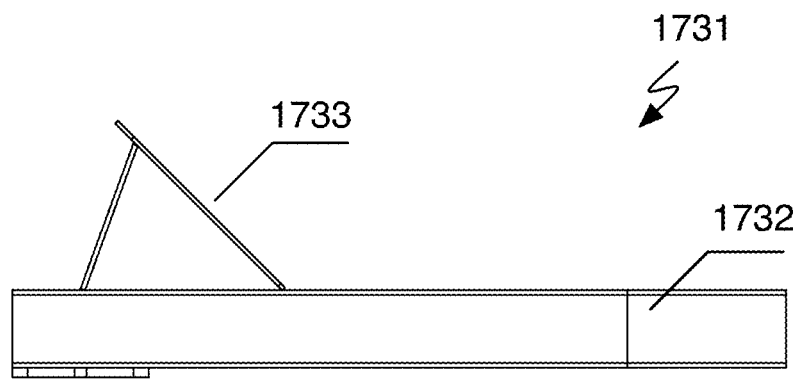
FIG. 17B is a schematic representation of a side view of an exemplary slotted transfer tray.
Figure 18A:
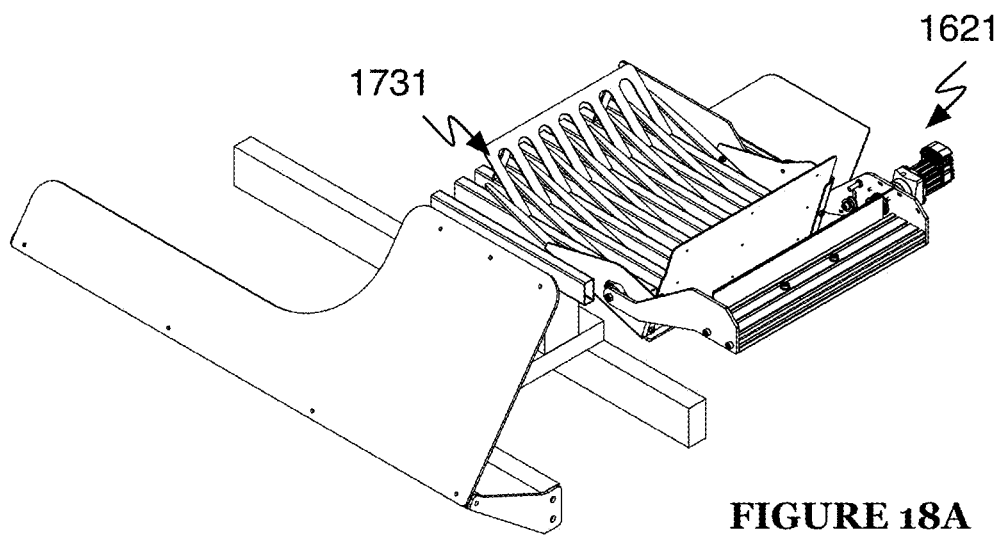
FIG. 18A is a schematic representation of a perspective view of an exemplary slotted item tray engaging with a slotted transfer tray.
Figure 18B:
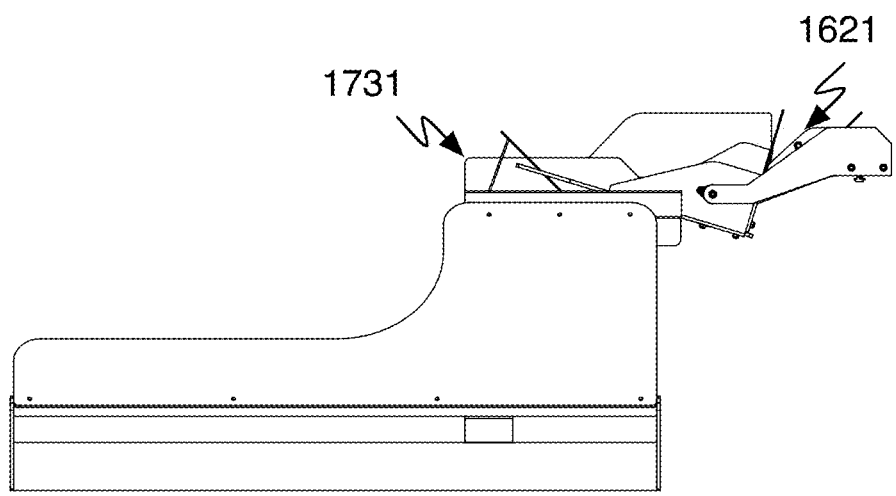
FIG. 18B is a schematic representation of a side view of an exemplary slotted item tray engaging with a slotted transfer tray.
Figure 19:
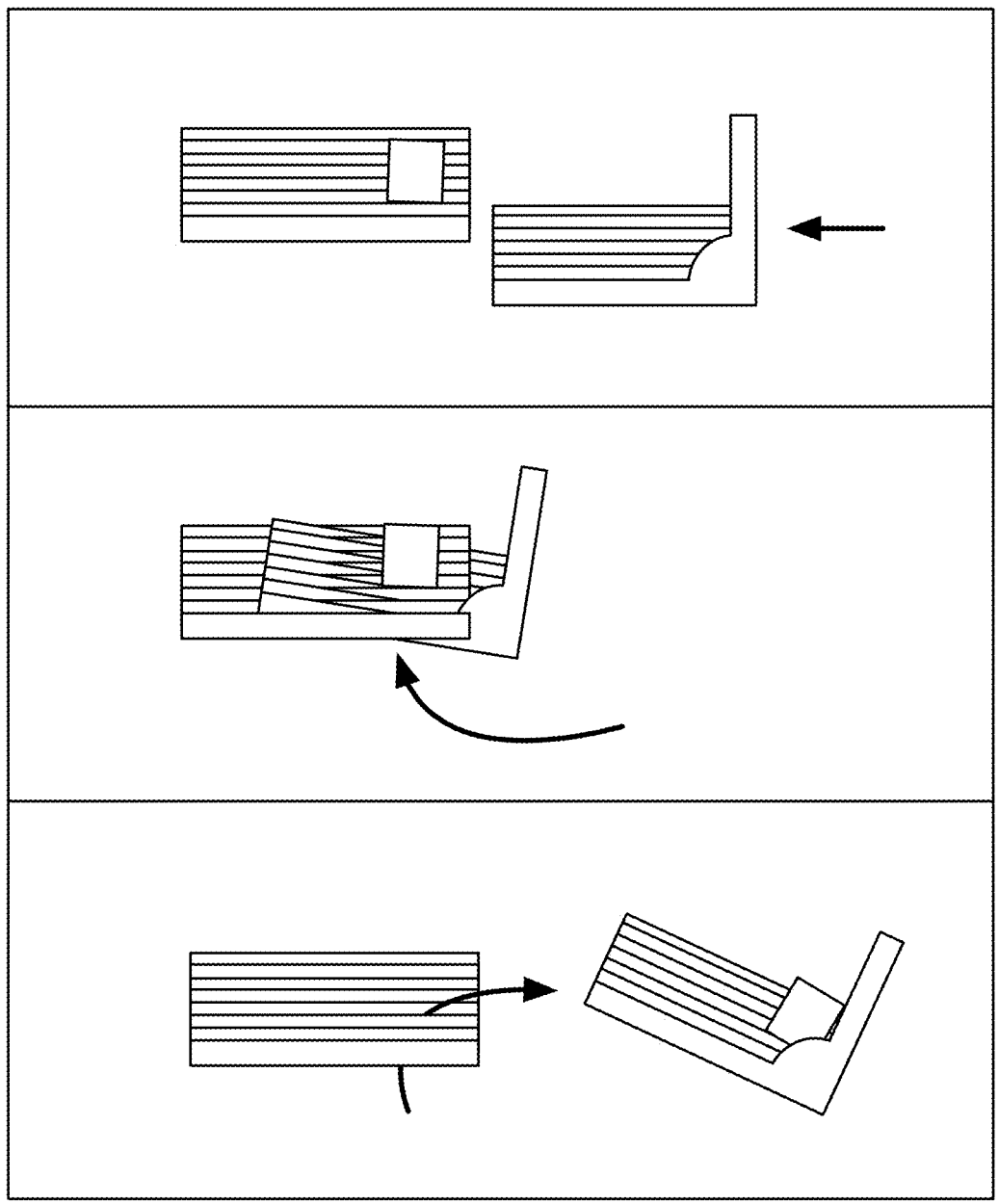
FIG. 19 is a schematic representation of a sequence of a slotted item tray collecting an item from a slotted transfer tray.

In one particular variation, the item tray can be a slotted item tray, where tray includes a set of protruding structures that define the resting surface of the item tray and which mesh or engage with a complimentary transfer system 130. As shown in FIGS. 16A-16C, a slotted item tray 1621 can have slotted extending arms 1622 that connect to a central holding tray 1623 with a backstop 1624. The extending arms 1622 can be tapered to address minor misalignment when engaging to collect an item. In a complimentary transfer system 130, the transfer system 130 can include a slotted transfer tray as shown in FIGS. 17A and 17B. The slotted transfer tray 1731 can include a slotted surface with a set of extending arms 1732. In one variation, the slotted transfer tray can additionally include a slotted ramp 1733. The slotted ramp can allow the extending arms of the item tray to pass through promoting a reliable transfer of an item. The ramp may additionally facilitate a smooth transfer of an item by mitigating the chances of an oversized item from catching when pushed forwards during a transfer. Additionally, one or more of the extending arms 1732 may be adjusted in length so as to allow clearance from a carrier arm or other parts of a slotted item tray. The set of extending arms 1732 can complement the slotted extending arms 1622 such that the slotted extending arms 1622 of the item tray (e.g., the protruding structures of the item tray) can pass through defined slots in the slotted item holder when collecting an item as shown in FIGS. 18A and 18B. In such a variation, the item tray may be inserted into position such that the extending arms 1622 come up from below an item resting on the transfer system 130 and then the item can be removed by pulling the item tray back while in a rotated carrying state as shown in FIG. 19.

The actuated item tray may alternatively use other design configurations. For example, the actuated item tray may alternatively be a container with bombay doors, a hatch, or another opening mechanism so that items contained within a container can be deposited when the mechanism is opened.

Another variation of the item holding and depositing system 122 can be a sorting robotic pick-and-place machine. This can be a robotic system such as in the robotic system 111 described above or one of its variations. In this variation, the item is grasped or gripped by a machine and then dropped into an appropriate item tote. In this variation, the base of the sorting robotic pick-and-place machine can be coupled to the actuated portion of the gantry system 121 such that it can be moved about the tote array 123. In a variation, where the sorting robotic pick-and-place machine provides a range of motion, the sorting robotic pick-and-place machine may augment the reachable range of the gantry system 121. In one implementation, the gantry system may provide actuation along a single axis extending outward from the item selection unit 110, and the sorting robotic pick-and-place machine is an articulated arm that can be oriented to position items perpendicular to this axis. In another variation, the sorting robotic pick-and-place machine may be a robotic system with more limited range of motion and may in some cases only be an end effector. For example, the gantry system 121 may have a rigidly fixed end effector such as described above such that it can grip and drop an item.

The output tote array 123 functions as an arrangement of item totes to receive items. The output tote array 123 preferably includes a plurality of item totes that are arranged within the reachable region of the item sortation unit 120. The item totes are preferably arranged in a grid fashion beneath the gantry system 121. The plurality of item totes 123 may include item totes that are boxes, bins, trays, bags, gaylords, containers, chutes to other containers, and/or other receptacles of items. The plurality of item totes 123 will generally include one type of item tote, but the plurality of item totes 123 may include multiple types of item totes which be similarly sized or have varying sizes.

The output tote array 123 is preferably a two-dimensional array of a plurality of item totes. The item totes in one variation are arranged in a grid. In one variation, the item sortation unit 120 has an output tote array 123 that is configured and arranged such that item totes are serviceable from one or more sides. For example, the array may have a rectangular grid arrangement with item totes added or removed from one or more side of the item sortation unit 120. In one implementation, the output tote array 123 includes 4-6 item totes arranged along n number of rows. The item totes may be on carts that can be slid in from a side. In one implementation carts can be slid in from two opposing sides. In one example, 4 or 6 totes are arranged along 10 or more rows. The number of rows (as well as the number of columns) in the output tote array 123 could be configured for different use-cases.

In some alternative implementations, item totes may be located in a variety of arrangements. In one example, the item totes could be placed in any suitable arrangement within a defined area that is reachable by the item sortation unit 120. The location of the item totes could be detected and then used as output totes.

In one variation, the output tote array 123 may be a defined empty space in which item totes can be positioned. In some variations, the system may dynamically detect and assign a detected item tote to an item output grouping. In another variation, item totes may have an organized arrangement. In some cases, the placement of the associated grouping for an item tote may be substantially statically associated with a position within the array. For example, the item tote in row two and column four may always be assigned for parcels for a particular route. In another variation, the grouping association of item totes may be dynamically assigned. This assignment may be automatically adjusted based on historical trends and predictions of expected item sorting. For example, more common groupings may be assigned positions closer to the item selection unit 110 to reduce sort processing time. This assignment may additionally be dynamically assigned based on identification of items from the input item region 112. This functions to adapt to current items needing sortation.

Preferably, the item tote array 123 includes an assembly with defined cavities that fit a plurality of item totes. The assembly could be a structure that functions to hold and/or guide the positioning of item totes. The assembly of the item tote array may include a set of alignment mechanisms to at least partially define positions of the item totes within the item tote array.

Figure 20:
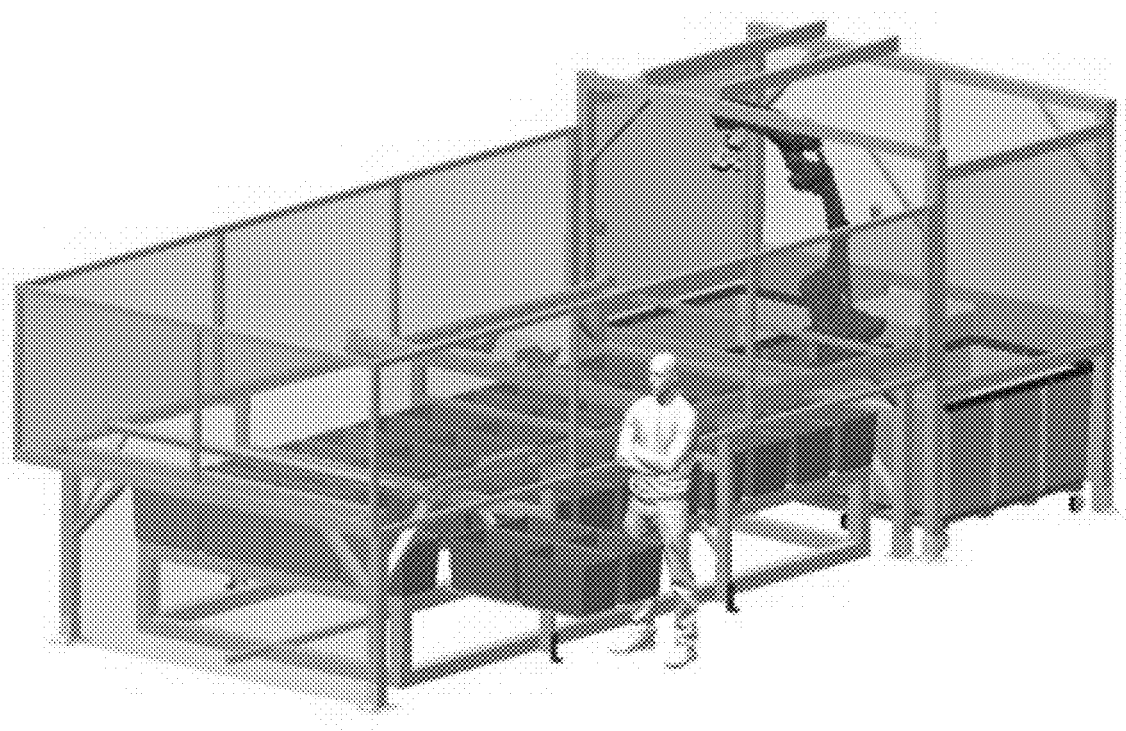
FIG. 20 is a schematic of a variation of the system with select item totes having been removed.

Item totes can preferably be selectively added and removed from the tote array 123 as shown in FIG. 20. In some variations, item tote array 123 includes an at least semi-automatic actuated system for adding and/or removing item totes. In other variations, an automated system may facilitate removing, adding, or otherwise exchanging item totes. In one variation, the item totes or collections of item totes may be positioned and retrieved from an automated robotic system. For example, a robotic transport device may move underneath one or more item totes, engage with the one or more item totes, and remove the one or more item totes. Similarly, the robotic transport device may move new item totes into position within the output tote array 123.

In one variation, the item totes can be containers on wheels. The item totes may also be a container on a type of conveyor system such that the filled item totes can be moved out of the tote array 123 and new item totes moved into the tote array 123.

Figure 21:
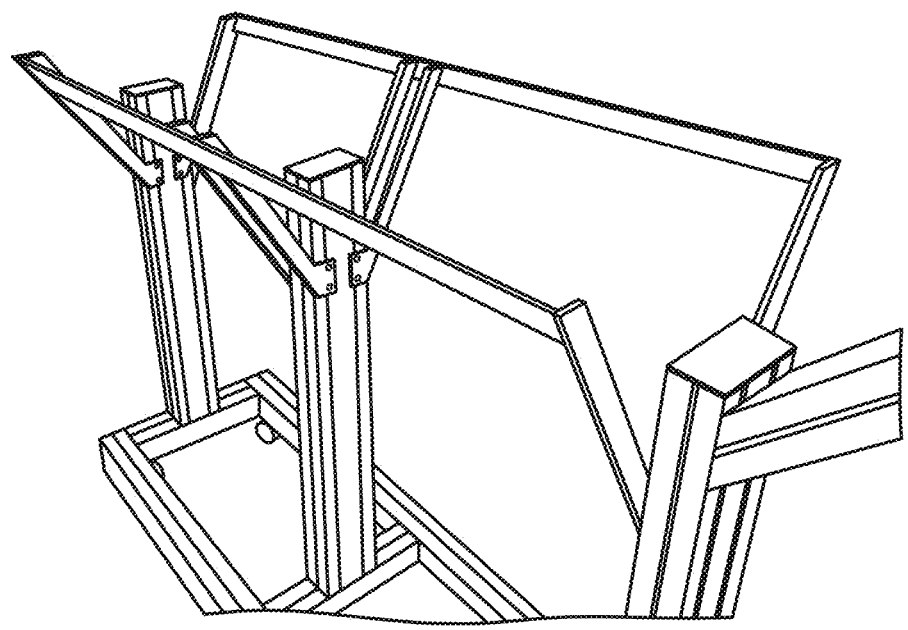
FIG. 21 is an exemplary image representation of an item tote for holding a mail bag with an indexing pin extending from the base.

In one variation shown in FIG. 21, an item tote cart may include a rigid assembly on which a bag can be positioned. A wheeled cart can have to two jaws extending outward that can be adjustably opened so that bags of different widths can be securely fitted over them and held in place.

Figure 22:
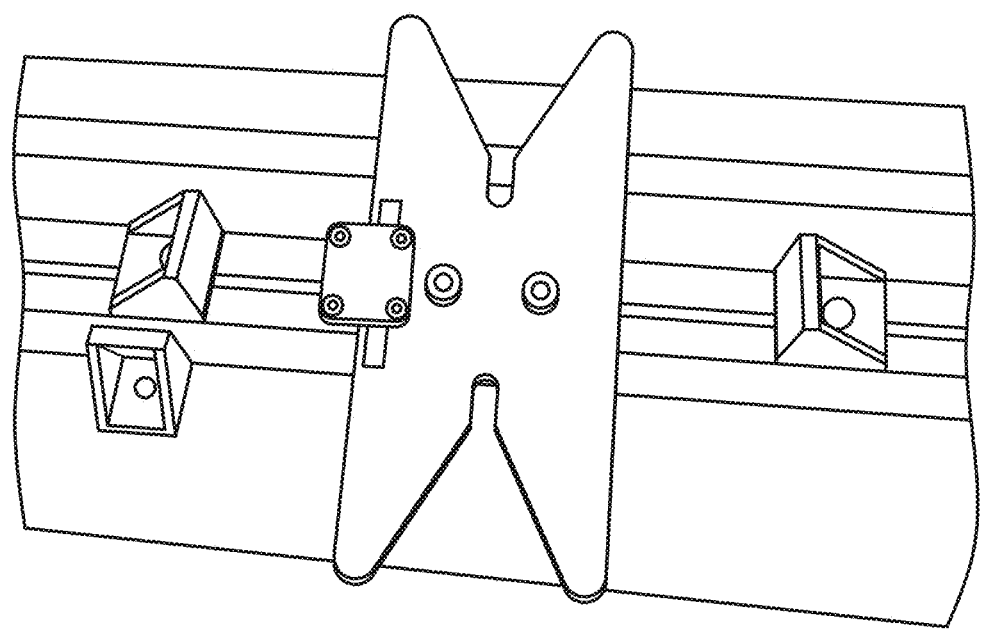
FIG. 22 is an image representation of a plate with an indexing grove of an assembly of the item sortation unit.

The tote array 123 may include a tote array alignment fixture that functions to structurally guide and restrict the arrangement of the item totes. Various fixtures or mechanisms may be implemented to mechanically restrict positioning of the item totes. In one variation, the alignment fixture could be a set of guiderails that extend in parallel across the tote array 123 thereby defining distinct rows (or columns) in which item totes can be inserted. In one variation, the item totes include a base with an indexing mechanism so that it is aligned when inserted. As shown in FIG. 21, a cart holding item totes may have a pin extending down that can slot into a defined indexing groove formed by an internally positioned plate within an item selection unit assembly as shown in FIG. 22. This functions to index the cart to a defined reference point or datum. In one implementation, the front wheels of the cart may lift over a rail or raised section on the floor to provide two additional datums to constrain the cart position in space with respect to the assembly relative to the gantry system 121. Additionally, such an alignment fixture may include a sensor to detect when an item tote or cart is position. For example, a momentary switch or proximity sensor may detect when a cart is slotted into the alignment fixture.

An output tote capacity sensor 124 functions to measure the capacity level of an item tote and/or to detect when an item tote is at proximity. A variety of sensor mechanisms may be used. In one implementation, a depth sensor or an imaging system can be downwardly attached to the gantry system 121. The depth sensor can detect or collect image data used in predicting the capacity level of an item tote as it passes over the item totes. The capacity of an item tote may be measured each time an item is deposited into it.

In one variation, the output tote capacity sensor 124 is coupled to the gantry system 121 such that the output tote capacity sensor 124 can be moved across the output tote array 123. the capacity of an item tote may be measured as the capacity sensor passes over item tote during use of the gantry system 121 such as when in transit and/or while depositing an item.

In another variation, each item tote may include a capacity sensor system to individually report capacity. For example, a load cell, proximity sensor, optical or mechanical switches, and/or other sensor systems may alternatively be employed. In a related variation, an array of capacity sensors or a sensor that can monitor multiple item totes from a displaced fixed location maybe used. For example, a camera mounted above the output tote array 123 may monitor at least a subset of item totes.

In some variations, the system may include a transfer system 130, which functions to facilitate handoff of an item between the item selection unit 110 and the item sortation unit 120. The transfer system is preferably an intermediary component that receives items from one or more item selection units 110 and has items transferred to an item sortation unit 120. In particular, the robotic system 111 places an item into the item transfer system 130 and the item is transferred into the item holding and depositing system 122 (e.g., into an item tray).

The transfer system 130 may be a component that is used for each handoff of an item between the item selection unit 110 and the item sortation unit 120. The transfer system 130 may alternatively be a component that can be dynamically used for select items for different scenarios. For example, the transfer system 130 may be used for transfer of an item to one of a set of item sortation units 120 when the item selection unit 110 and that item sortation unit 120 do not have a directly overlapping reachable region. In another example, the transfer system 130 may be used for transfer of an item when the item sortation unit 120 is currently not ready to collect another item (e.g., is still sorting a previously collected item).

The transfer system 130 in some variations, have items substantially static such that the placement of an item by the robotic system 111 is substantially the same when the item is collected by the item holding and depositing system 122. The transfer system 130 in alternative variations have items move from an input region to an output region, where the robotic system places items in the input region, the transfer system 130 facilitates movement of the item from the input region to the output region, and item is collected by the item holding and depositing system 122 in the output region.

In one variation, the transfer system 130 includes a substantially static transfer tray, which functions as a surface or container on which items may be placed and held during handoff between the item selection unit 110 and the item sortation unit. In one variation, the transfer tray could be a substantially flat surface (e.g., solid, grated, slotted, or otherwise). The transfer tray could alternatively be a container with side walls and/or surfaces defined along a non-horizontal plane (here horizontal is used to refer to a plane parallel to a ground plane).

A static transfer tray is preferably positioned in a region in between and adjacent to the item selection unit 110 and the item sortation unit 120. In one variation, the transfer tray is intended for receiving and holding single item at any one time. Alternatively, multiple items may be placed on the transfer tray. For example, a wide transfer tray may hold multiple items side by side. The control system 140 can store the location of different items such that the item sortation unit 120 can be controlled to collect one of a set of items on the transfer tray and sort into a targeted tote for that particular item.

In one variation, the transfer system 130 may include a slotted transfer tray, which functions to receive and hold an item similar to the static transfer tray, but to have a structure such that an item holding depositing system 122 can actively retrieve the item from the slotted transfer tray. As described herein, such a variation will generally involve the item holding and depositing system 122 including a slotted item tray. The slotted transfer tray will generally be a static transfer tray as described above, but the slotted tray may be used with other variations of the transfer system 130. For example, a slotted conveyor system could function similarly, where items could be conveyed along a path of the conveyor system but also actively retrieved by a slotted item tray.

A slotted transfer tray may have the benefit of the items being collected by the item holding and depositing system 122 while substantially maintaining the orientation of the object when placed by the robotic system 111.

As with the static tray described above, the slotted transfer tray may be used for holding single item at any one time. Alternatively, multiple items may be placed on the transfer tray. For example, a wide transfer tray may hold multiple items side by side. The item sortation unit 120 could dynamically collect one of the multiple items.

In another variation, the transfer system 130 may include an actuated transfer tray, which functions to actuate the transfer tray to facilitate transferring of an item to the item holding and depositing system 122. An actuated transfer tray may translate and/or rotate. In one example, an actuated transfer tray may rotate to deposit a held item into the item tray of the item holding and depositing system 122.

In another variation, the transfer system 130 could be or include a passive conduit such as a chute or ramp so that items deposited can slide, fall, or otherwise move from an input region to an output region.

In another variation, the transfer system 130 could be or include a conveyor system, which functions to translate an item along a path.

In one variation, the transfer system 130 may be equipped with sensors or other elements that can act on an item when present at the transfer system. In particular, the transfer system 130 could include a weight sensor so that items could be weighed prior to being transferred to the item sortation unit 120. In one example, the weight sensor could be a load cell (or other sort of pressure sensor, strain sensor, digital scale, or the like to estimate/measure weight) integrated into a transfer tray.

The control system 140 functions to manage coordinated operation of the item selection unit 110, the item sortation unit 120, and optionally a transfer system 130.

The control system 140 can include one or more computer processors and one or more computer readable mediums (e.g., non-transitory computer-readable mediums) storing instructions that, when executed by the one or more computer processors, cause the item selection unit 110 to grasp an item, optionally perform any item processing (e.g., scanning an barcode), and translate and orient the grasped item into position for transfer to the item sortation unit 120; and further cause the item sortation unit 120 to position the item holding and depositing system 122 into a position for receiving or collecting a transferred item from the item selection unit 110, moving the item holding and depositing system 122 into position above a targeted output item tote, and depositing the item into the targeted output item tote. In a similar manner the control system 140 may manage control of the transfer system 130 if the transfer system 130 includes active components that need to be controlled.

The control system 140 may be a centrally located computing device communicatively connected to the item selection unit 110, the item sortation unit 120, and optionally the transfer system 130. The controls system 140 may alternatively be comprised of two or more computing devices with control subsystems that can operate in coordination to facilitate the sortation of items from the input item region 112 to a final output item tote. In some variations, some components or functionality of the system may operate automatically without need for outside control.

The control system 140 may be communicatively connected to one or more sensors of the system to facilitate use of collected data into the operation of the system. For example, an output tote capacity sensor 124 may sense current capacity levels of one or more output item totes, which can be used in controlling selection of items, the assignment of output totes for an item, signaling for changes to item totes in the output tote array 123.

In one variation, the item selection unit 110 and the item sortation unit 120 include respective internal control systems used in managing portions of self-operation. The control system 140 may facilitate coordinated operation of such systems.

In one implementation, the item selection unit 110 and the item sortation unit 120 are operated in a manner where the state of one or both impact the operation of the other. In one example, the state of the item sortation unit 120 (e.g., status of sorting a current item, and/or capacity of output item totes) may impact the selection of items, while the state of item selection can alter how the item sortation unit 120 plans and allocates.

In an alternative implementation, the two systems may be controlled substantially independent from each other. The independent operation can preferably result in a coordinated operation of the system. In one example, the item selection unit 110 independently picks and retrieves items and places the item into an output region if and when the output region can receive the item (e.g., when no other item is in the output region and/or when the item holding and depositing system 122 is in position to receive an item). Item identity may be communicated to the item sortation unit which can then be used to set a targeted output for the current item. The item sortation unit 110 can sort an item into a targeted output if and when an item is identified and available in a retrieval region.

Other alternative approaches to coordinating operation may be used.

The system may additionally include a user management system, which functions to enable collection of user input and/or outputting information concerning the state of the system. The management system may include a dashboard in which operational configuration and settings of the system may be set. The management system may alternatively include one or more input or output UI elements which could be terminals, buttons or other forms of user input, displays, lights, audio systems (for audio alerts), and the like.

The user management system may include one or more user interfaces to output status of the system. In one example, identifiers of item grouping for the plurality of item totes may be communicated through one or more user interface such that a human operator can know the identity of an item tote during or after sortation.

A user interface output may additionally be used in signaling for changes to item totes in the output tote array 123. Workers and/or automated systems may use the output signals to know when and how to exchange item totes from the output tote array 123.

3. Method

A method for robotic sorting of items functions to appropriately sort unsorted collections of items into groups held in item totes, and can include: at an item selection unit, singulating items from an item input; transferring a singulated item from the item selection unit to an item sorting unit; translating the item within the item sorting unit to a targeted item tote within an array of item totes; and depositing the item into the targeted item tote. In one preferred variation, singulating preferably includes picking using a robotic arm with an end effector such as described above for the robotic pick-and-place system, and translating the item preferably includes horizontally translating with a two-dimensional gantry system.

The method can enable the cooperative operation of an item selection unit with an item sortation unit. The method can decouple tasks of picking an item from sorting into a large number of possible of outlets (e.g., large could be 30 or more).

Figure 23:
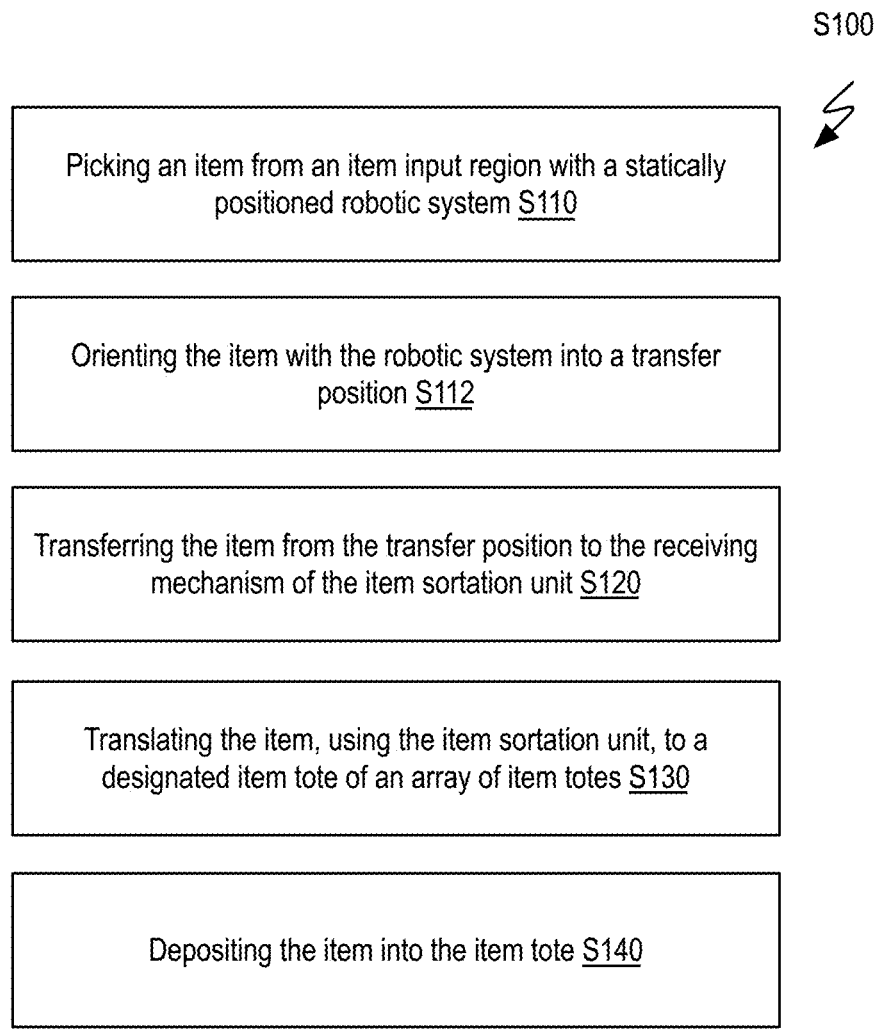
FIG. 23 is a flowchart representation of a first method.

As shown in FIG. 23, a method S100 for robotic sorting of items can include picking an item from an item input region with a statically positioned robotic system S110; orienting the item with the robotic system into a transfer position S112; transferring the item from the transfer position to the receiving mechanism of the item sortation unit S120; translating the item, using the item sortation unit, to a designated item tote of an array of item totes S130; and depositing the item into the item tote S140.

The method may be implemented in various ways and as such different variations of the method may enabled such as: processing of item prior to sorting, dynamically identifying to sorting the item, using detected attributes of an item in determining how to place the item for more successful depositing of the item into an item tote, directing transferring an item between an item selection unit and an item sortation unit, using a transfer system as an intermediary component for handoff of an item.

Figure 24:
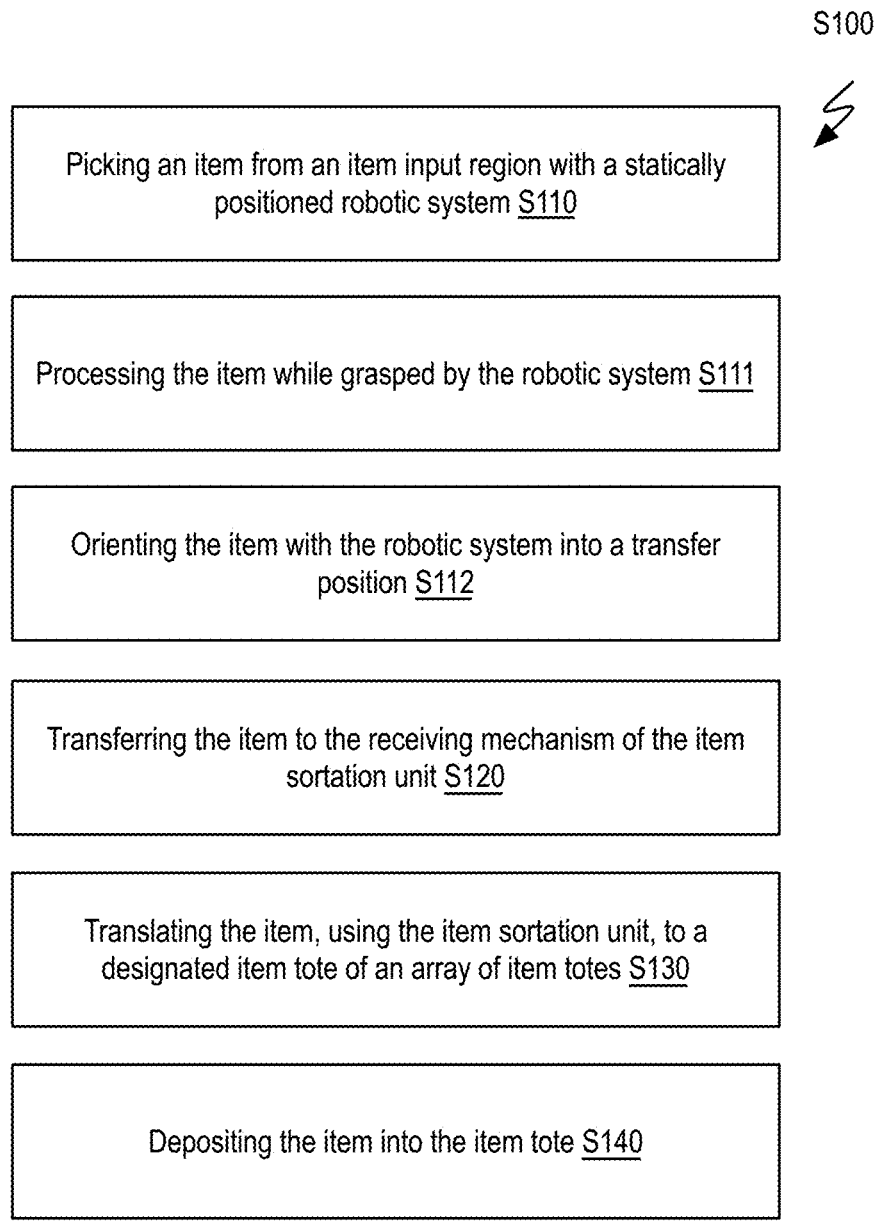
FIG. 24 is a flowchart of a method variation with item processing.

As shown in FIG. 24, one method variation enabling processing of an item can include picking an item from an item input region with a statically positioned robotic system S110; processing the item while grasped by the robotic system S111; orienting the item with the robotic system into a transfer position S112; transferring the item to the receiving mechanism of the item sortation unit S120; translating the item, using the item sortation unit, to above a designated item tote of an array of item totes S130; and depositing the item into the item tote S140. Processing the item may include variations of processing such as identifying an item, scanning item for dimensioning, applying a label, or performing any suitable task with the item.

Figure 25:
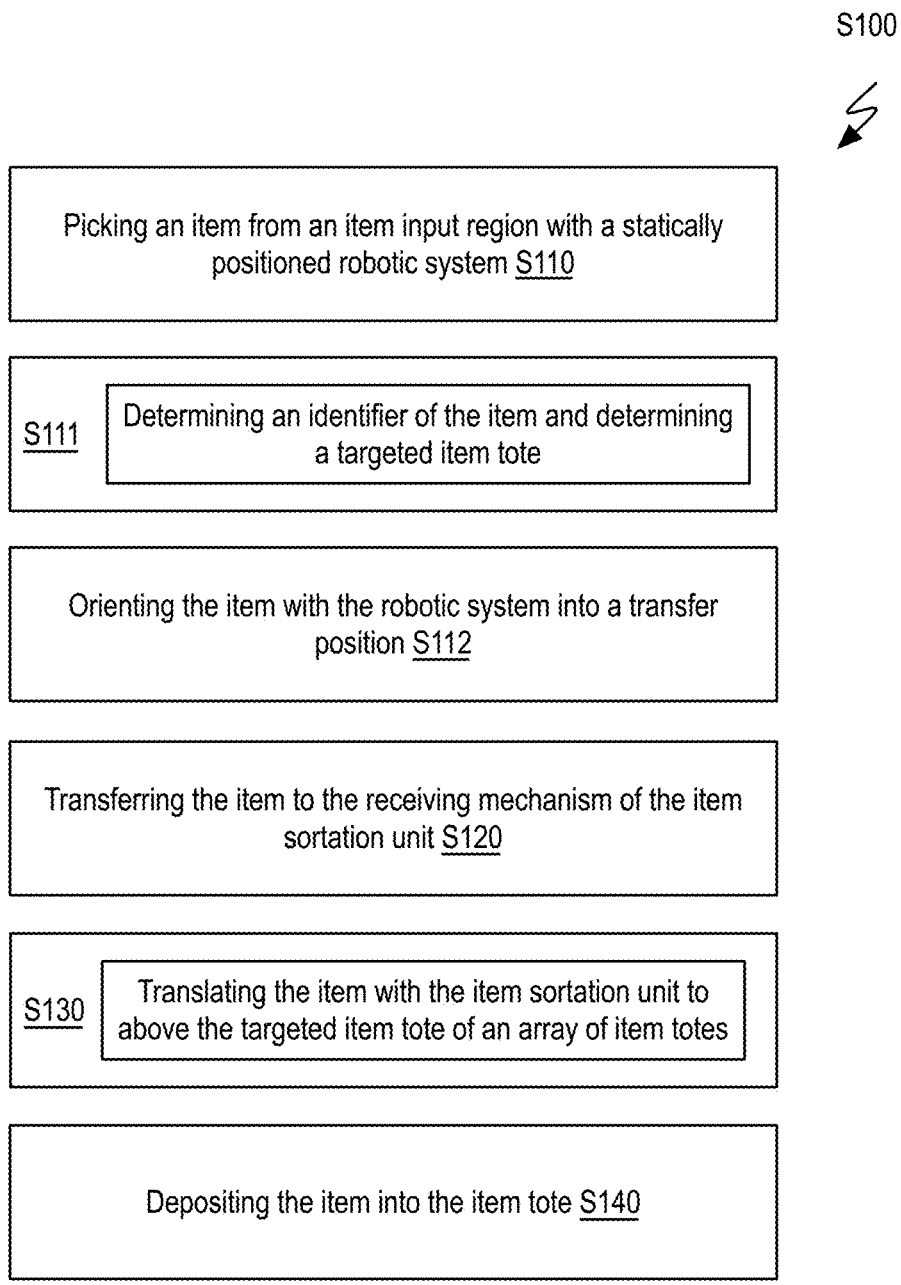
FIG. 25 is a flowchart of a method variation with item identification.

As shown in FIG. 25, one method variation using processing for identification to determine how to sort can include: picking an item from an item input region with a statically positioned robotic system S110; determining an identifier of the item and determining a targeted item tote (S111); orienting the item with the robotic system into a transfer position S112; transferring the item to the receiving mechanism of the item sortation unit S120; translating the item with the item sortation unit to above the targeted item tote of an array of item totes S130; and depositing the item into the item tote S140.

Figure 26:
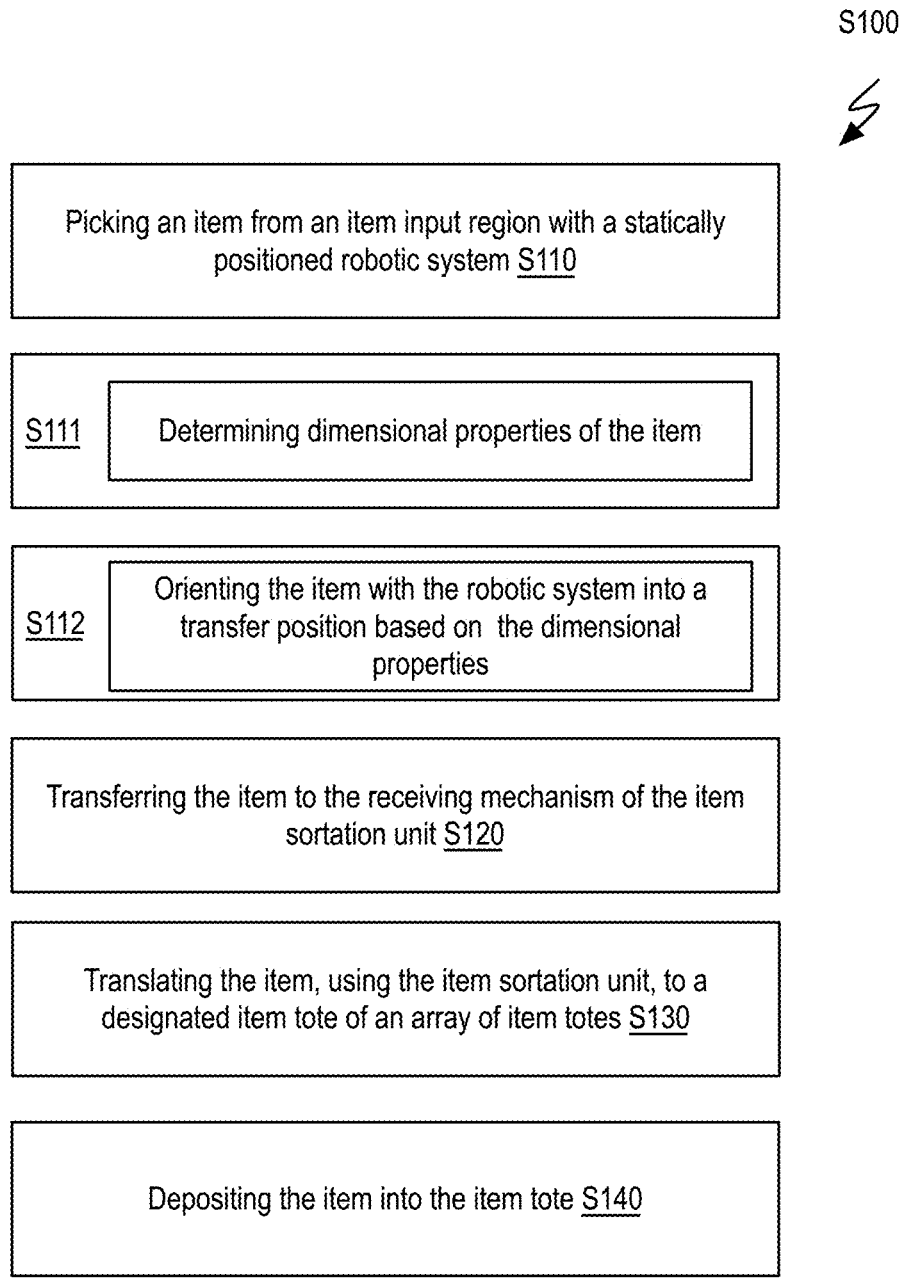
FIG. 26 is a flowchart of a method variation using item dimensioning.

As shown in FIG. 26, one method variation additionally or alternatively using processing to use the form of an item so that the item can be more optimally be positioned for better depositing into an item tote can include picking an item from an item input region with a statically positioned robotic system S110; determining dimensional properties of the item (S111); orienting the item with the robotic system into a transfer position based on the dimensional properties S112; transferring the item to the receiving mechanism of the item sortation unit S120; translating the item, using the item sortation unit, to an item tote of an array of item totes S130; and depositing the item into the item tote S140. Preferably, the item can be oriented so that the item can better slide into the item tote and avoid flipping over, getting caught in the entry of the item tote, or entering the item tote in an unpredicted manner. More specifically, orienting the item can include orienting the item into a transfer position for controlled item depositing into an item tote based on the dimensional properties. The method may employ modeling of object behavior using the item dimensions. Alternatively, a heuristic may be used in determining preferred orientation.

Figure 27:
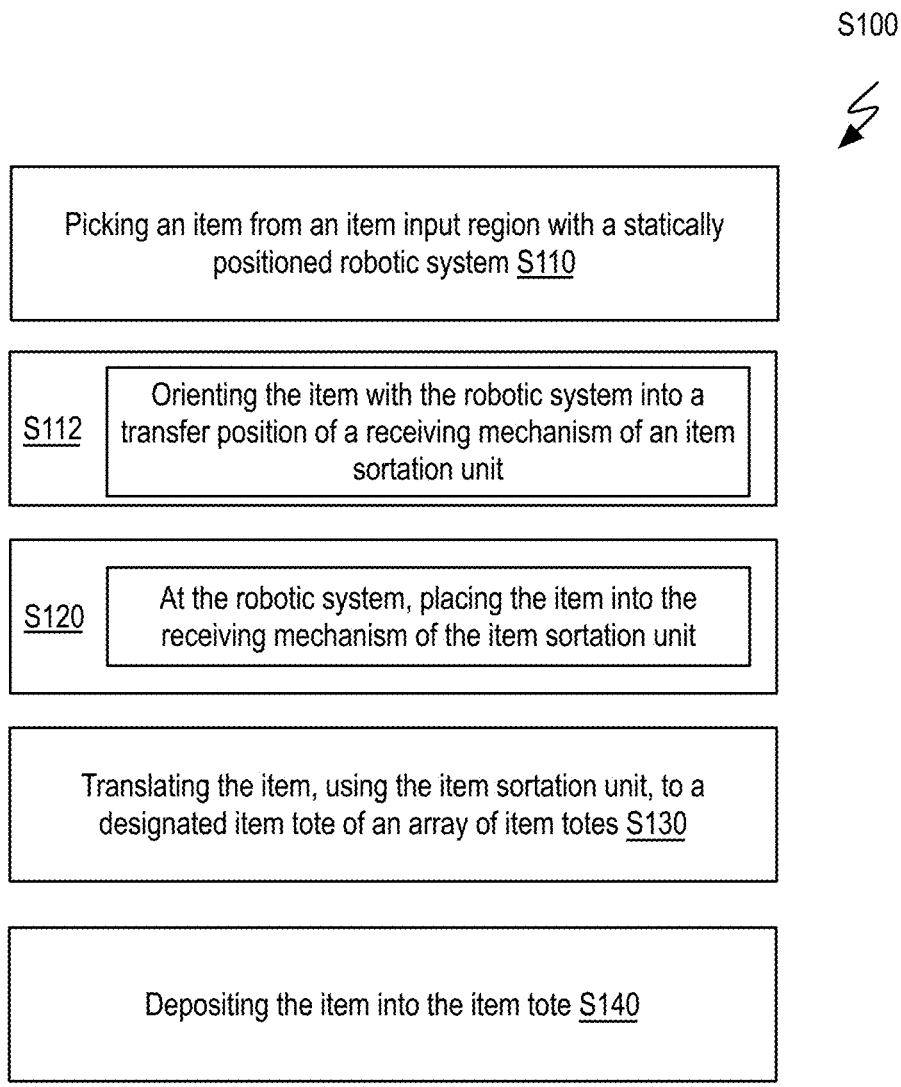
FIG. 27 is a flowchart of a method variation with direct transfer between an item selection unit and an item sortation unit.

As shown in FIG. 27, one method variation that directly transfers items between an item selection unit and an item sortation unit can include picking an item from an item input region with a statically positioned robotic system S110; orienting the item with the robotic system into a transfer position of a receiving mechanism of an item sortation unit (S112); at the robotic system, placing the item into the receiving mechanism of the item sortation unit S120; translating the item with the item sortation unit above item tote of an array of item totes S130; and depositing the item into the item tote S140.

Figure 28:
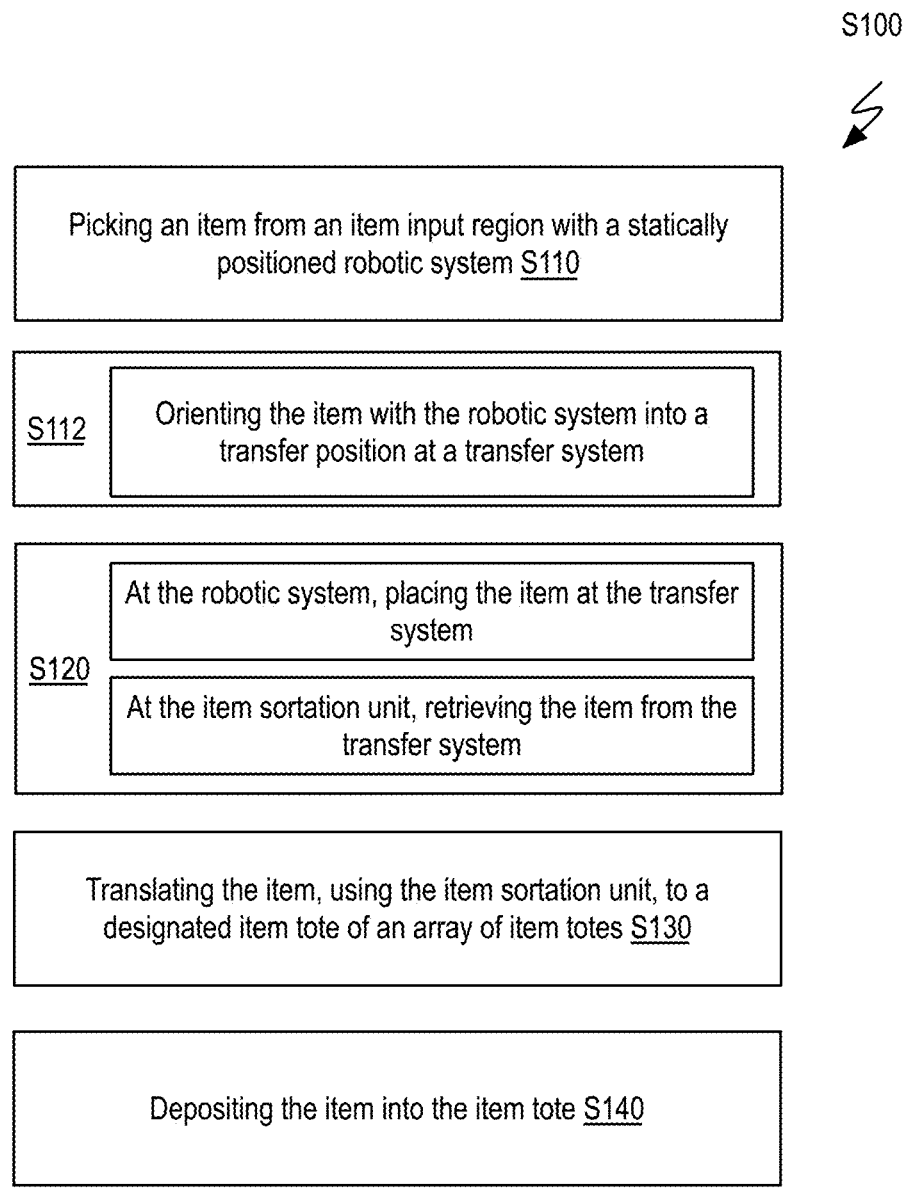
FIG. 28 is a flowchart of a method variation with indirect transfer between an item selection unit and an item sortation unit using a transfer system.

As shown in FIG. 28, one method variation that uses a transfer system to indirectly transfer items between an item selection unit and an item sortation unit can include picking an item from an item input region with a statically positioned robotic system S110; orienting the item with the robotic system into a transfer position at a transfer system (S112); at the robotic system, placing the item at the transfer system and, at the item sortation unit, retrieving the item from the transfer system (S120); translating the item with the item sortation unit above item tote of an array of item totes S130; and depositing the item into the item tote S140.

Figure 29:
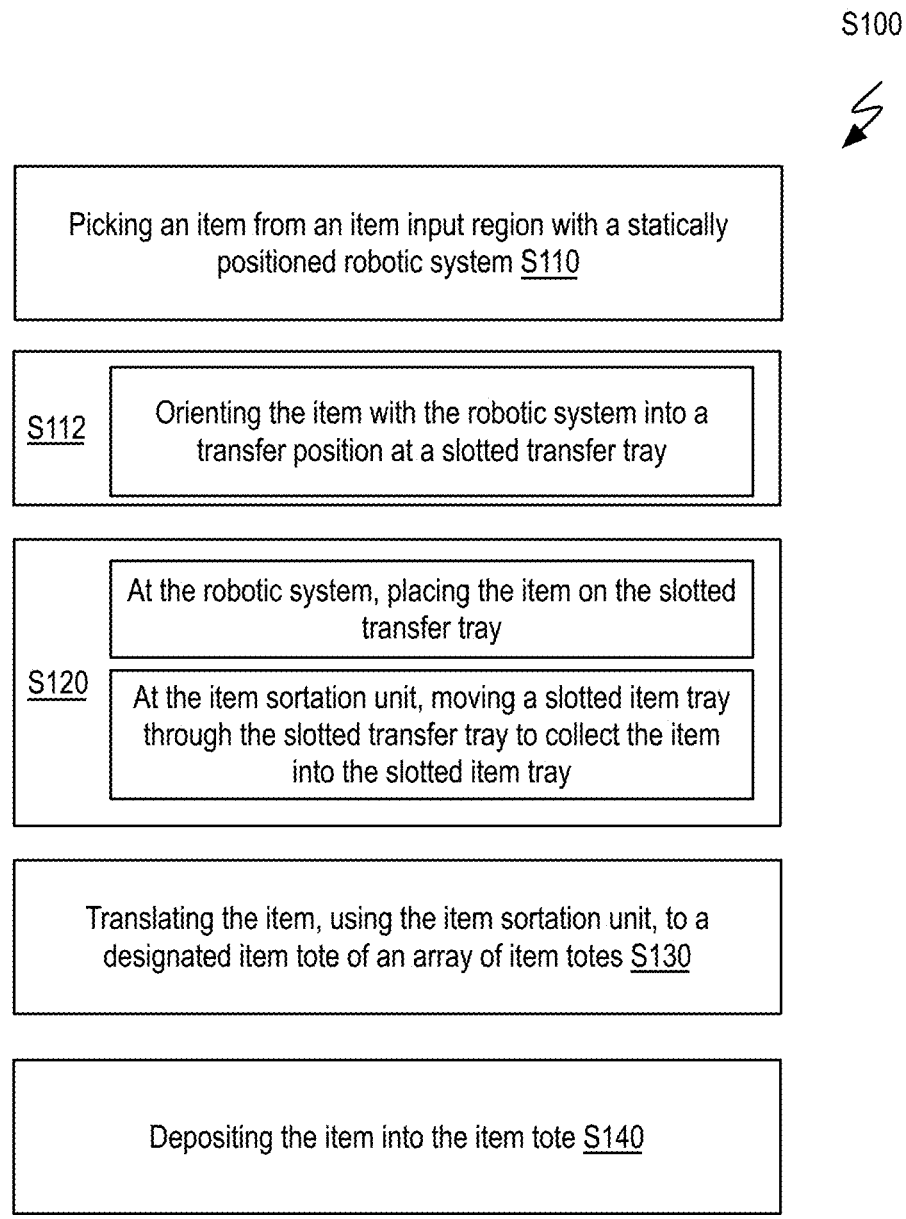
FIG. 29 is a flowchart of a method variation with indirect transfer using a slotted transfer tray.

As shown in FIG. 29, one method variation that uses a slotted transfer tray variation of the transfer system can include: picking an item from an item input region with a statically positioned robotic system S110; orienting the item with the robotic system into a transfer position at a slotted transfer tray (S112); at the robotic system, placing the item on the slotted transfer tray and, at the item sortation unit, moving a slotted item tray through the slotted transfer tray to collect the item into the slotted item tray (120); translating the item with the item sortation unit above item tote of an array of item totes S130; and depositing the item into the item tote S140.

Figure 30:
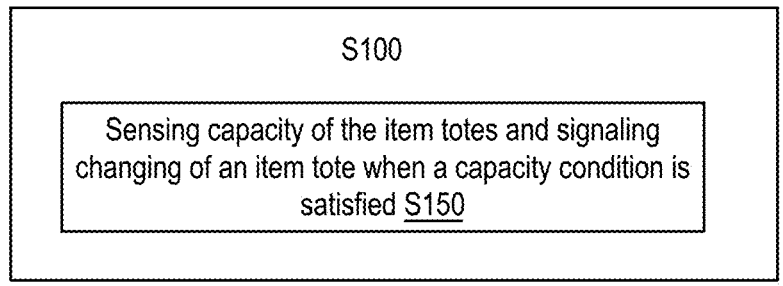
FIGS. 30 and 31 are flowchart representations of the method.

In some implementations, the method may additionally facilitate management of item totes so that item totes can be removed when full and replaced with item totes with capacity for more items. Accordingly, the method may include sensing capacity of the item totes and signaling changing of an item tote when a capacity condition is satisfied S150 as shown in FIG. 30.

Figure 31:
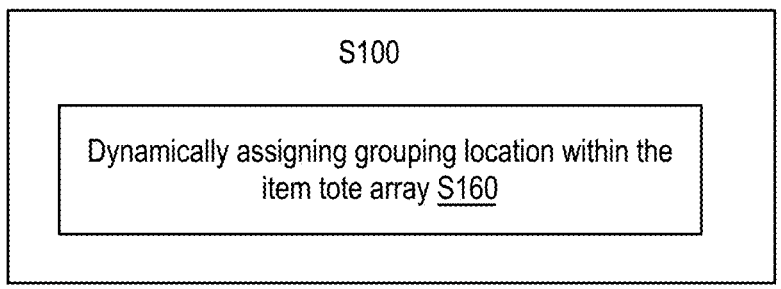

In some implementations, the method may additionally facilitate automated management of grouping assignment, which may be a way for the sorting system to automatically improve efficiency or to adjust dynamically to new groupings. Accordingly, the method may include dynamically assigning grouping location within the item tote array S160 as shown in FIG. 31.

The method is preferably implemented in combination with a robotic horizontal sorting system such as the one described above but may alternatively be used in combination with any suitable robotic or automated system.

Block S110, which includes picking an item from an item input region from a statically positioned robotic system, functions to singulate an item from a collection of items. The collection of items can be an unsorted collection. For example, the items could be a collection of items in a gaylord or bin. Alternatively, items may be supplied in more organized fashion and may even be fed in through a conveyor system.

Picking an item preferably includes grasping an item using a robotic pick-and-place machine as described above. Accordingly, the robotic system could be a robotic articulated arm with an end effector. Any suitable robotic system may alternatively be used in selecting an item. The robotic system is generally static in that it is in a fixed position. In some variations, the robotic system could be movable with limited range of motion across a floor region. In some other variations, the robotic system could be a mobile robot.

As one potential benefit of the method is an ability to handle a wide variety of item types. Accordingly, the method can be implemented in combination with an intelligent robotic system that dynamically picks items accordingly to planned grasp attempts customized to the unsorted items. In one implementation, picking an item can include generating and selecting a grasp plan, performing the selected grasp plan, and proceeding with subsequent handling of the item (e.g., S111, or S112).

Generating and selecting a grasp plan of one variation can include collecting image data of the input item region, segmenting the image data into region of interest masks, evaluating image data through a trained grasp quality model to generate a set of candidate grasp plans, and processing candidate grasp plans and selecting a grasp plan. This may be used in determining which item to pick next, selecting which end effector to use, the motion path for grasping and extraction, the grasp point to avoid or target grasping at key features (e.g., barcodes or address labels) and/or other aspects involved with picking an item from a group of items. Any alternative approach to picking an item may alternatively be used.

As one variation, picking an item may include determining an item for selection based on expected item processing time of the item sortation unit for an item currently being sorted by the item sortation unit. For example, if an item is heavier (requiring slower movement) and being deposited in an item tote at the far end of the output tote array resulting in a longer expected item processing time, then an item from the input item region may be picked that may take more time than other input items thereby taking advantage of the longer item processing time window. Conversely, if an item is light and being deposited in an item tote at the near end of the output tote array, which results in a shorter expected item sorting processing time, then an item from the input item region may be picked that can be quickly grasped and processed to avoid the item sortation unit remaining idle as long compared to an item that may be more time consuming to pick.

As another variation, picking an item may include determining an item for selection based on expected tote array status. For example, items that are predicted or expected to be for totes that need changing or are being changed because they are at capacity may be avoided. In some instances, the grouping of an item may be unknown until processing the item by scanning a barcode. In these situations, if a grasped item is identified as being an item designated with an item tote that is not available, then the method can proceed to abandoning item processing of that item and proceed to processing a new item. An item tote may not be available because it is at capacity, the item tote is being changed to a non-full item tote, or perhaps no currently present item tote is associated with that output grouping. Abandoning item processing may include dropping the item. Abandoning item may also include placing item within the item input region or a holding area, which may allow the item grasp processing to avoid rescanning and/or to increase the probability for a successful grasping during a subsequent attempt.

The optional process of block S111, which includes processing the item while grasped (i.e., picked) by the robotic system, functions to perform one or more operations with the item while grasped. This can include processes for identifying the item, characterizing the item, modifying the item, or performing any suitable operation with the item. In some implementations, multiple processes may be used simultaneously and/or sequentially.

In one variation, processing the item while grasped can include determining an identifier of the item. This may be used when information concerning the identity of the item is unknown prior to picking the item. Accordingly, the item may be scanned or imaged to determine a designated grouping. For example, for parcels, an address may be scanned and used for determining which route group to use for the parcel. Determining an identifier of the item may include scanning a barcode (or other suitable type of machine readable code or information), reading an RFID tag or reading another type of wireless identifier signal, visually classifying the item using computer vision analysis, and/or using some other identification or classification technique.

After determining the identifier of the item, then in some variations, the method can include determining a targeted item tote of the item based on the identifier of the item. In other words, an item can be picked, scanned to determine its identity, and then based on the identity query a database to determine which one or more targeted item tote. The item sortation unit can then facilitate sorting the item into the targeted item tote when translating the item to an item tote for depositing (e.g., S130).

In another variation, processing the item while grasped can include determining dimensional properties of the item, which functions to sense or detect one or more dimensions of the item. In one variation, determining dimensional properties of the item can include determining a bounding volume of the item (e.g., height, width, and depth). In another variation, determining dimensional properties of the item may include collecting a full or partial 3D scan of the surface of the item. Determining dimensional properties can include sensing one or more dimensional metrics of the item. This may involve moving the item in range of a dimensional camera or other sensing system. This may additionally include manipulating item within the view of a sensor for scanning different views of the item. In addition to sensing dimensions, image data may be used to predict dimensions and/or form of the object using an AI classifier model or other technique.

The dimensional properties may be used for any suitable purpose, but in one particular variation, the dimensional properties may be used in predicting a placement orientation of the item for depositing into an item tote. In other words, the dimensions and/or shape of the item can be used for figuring out how the item may be best placed in an item tray of an item sortation unit so that when it deposits the item into an item tote it has high confidence for successful depositing. This can avoid situations, where items of more irregular forms could flip over and miss an item tote. In one example, the dimensional properties of the item can be used in determining if an item is larger in one or more axes than the container opening and then orienting the item such that when deposited the object enters an item tote with a side with dimensions that do fit within a defined opening of the item tote.

A variation that includes determining dimensional properties of the item may additionally include a variation of orienting the item with the robotic system into a transfer position S112, where the transfer position is based on the dimensional properties.

Block S112, which includes orienting the item with the robotic system into a transfer position, functions to move position the item using the robotic system in order to prepare for or to perform a transfer of the item. Orienting the item preferably includes translating the item using the robotic system from a position in the item input region to another location for transferring the item.

As discussed above, orienting the item may additionally predictively and proactively orient the item based on dimensional properties of the item. The dimensional properties may be detected during processing the item as discussed above but may alternatively be determined through other sources such as if item dimensions are retrievable using the item identifier. Orientation may additionally account for the current level and surface properties of items in a targeted item tote. For example, the item may be positioned so that it better fits into a collection of items in a targeted item tote.

As an additional or alternative use of the dimensional properties of an item, the dimensional properties may be used for determining if the item can be stored in a targeted item tote. This can function to avoid placing an item into an item tote such that the item tote becomes overfilled. As discussed herein, the capacity level of item totes may be sensed or otherwise tracked. An item can be deposited into a targeted item tote if a predicted resting pose of the item (after depositing into the tote) will fit (e.g., not overflow capacity). If an item is predicted to not fit in the targeted item tote, the system can dynamically switch to sorting of a new item. It may additionally signal to remove the full tote and/or to load a new tote so that the item may be later deposited.

In a direct transfer variation, orienting the item with the robotic system into a transfer position S112 includes orienting the item with the robotic system into a transfer position of a receiving mechanism of an item sortation unit, this functions to transfer the item directly from an item selection unit into the item sortation unit. Preferably, the receiving mechanism is an item tray or other suitable type of receiving mechanism. For an item tray receiving mechanism, the item is moved and oriented to a transfer position above the item tray and then set down, dropped, or otherwise deposited into the item tray. In this way, block S120 can include at the robotic system, placing the item into the receiving mechanism of the item sortation unit S120.

In a variation with a receiving mechanism that is a sorting robotic pick-and-place machine, the item may be moved and oriented into a transfer position within the reachable range of the sorting robotic pick-and-place machine. The method can include, at the sorting robotic pick-and-place machine, grasping the item from the robotic system when the item is in the transfer position.

In an indirect transfer variation, a transfer system may be used as an intermediary conduit between an item selection unit and an item sortation system. In an indirect transfer variation, orienting the item with the robotic system into a transfer position S112 includes orienting the item with the robotic system into a transfer position at a transfer system. This functions to move the item to a transfer system. This variation can additionally include, at the robotic system depositing the item onto the transfer system. In other words, the robotic system can let go or release the item such that the item is transferred temporarily to the transfer system. As discussed above, this may involve setting the item down so that it is in a predicted orientation that promotes better depositing into an item tote. The item can be held at the transfer system until it can be handed off to the item sortation unit during Block S120.

Various forms of a transfer system may be used as discussed herein and may include a static transfer tray, a slotted transfer tray, a conveyor system, and/or other component variations. In one exemplary implementation, the transfer system can be a slotted transfer tray. Accordingly, the method can include orienting the item with the robotic system into a transfer position at a slotted transfer tray, and, at the robotic system, placing the item on the slotted transfer tray.

Block S120, which includes transferring the item from the transfer position to the receiving mechanism of the item sortation unit, functions to transfer the item to the item sortation unit. Preferably, the item is deposited into an item tray movable by a gantry system of the item sortation unit. The implementation of transferring the item may depend on the form of transfer. In some variations, the method can use a direct transfer of the item and other variations the method can use an indirect transfer.

As discussed above, in a direct transfer variation, the item may be transferred directly from the item selection unit (e.g., the robotic system) to a receiving mechanism of the item sortation unit. In one preferred implementation, an item is moved to a particular position, and an actuated item tray of a gantry system is moved to below the item. This stage additionally includes positioning the gantry system into a transfer position and state. The receiving mechanism may be set to a receiving position to facilitate holding of the item. For example, an actuated item tray may be rotated to serve as a container of the item. The robotic system may also dynamically orient the item for preferred arrangement within the actuated item tray. For example, an elongated item may be oriented in a particular way so that it is best held by the actuated item tray. Once in position, the robotic system can drop the item thereby transferring the item to the gantry system.

In an indirect transfer, the item may be transferred from the transfer system, where the item is being held, to a receiving mechanism of the item sortation unit. As the item is being held at the transfer system, a mechanism maybe used to cause the item to be transferred.

With respect to a variation that uses a slotted transfer tray, the item tray may be a slotted item tray. A slotted item tray variation may include, at the item sortation unit, moving a slotted item tray through the slotted transfer tray to collect the item into the slotted transfer (120). The "teeth" (i.e., the extending protrusions) of the slotted item tray and slotted transfer tray can mesh such that the slotted item tray can lift up and/or rotate through the slotted transfer tray thereby collecting the item from the transfer tray. In some variations, the item will substantially maintain its orientation when such a transfer happens with a sotted item tray.

Block S130, which includes translating the item (using the item sortation unit) to a designated item tote of an array of item totes, functions to move the item into position for depositing the item into a designated item tote. The item is preferably moved into a position above the designated item tote. The position is preferably determined based on a designated grouping of the item. As discussed above, the grouping may be detected when processing the item or determined in any suitable manner. Translating the item can include moving of a gantry system to move the receiving mechanism (e.g., the item tray) to a region of the item tote array.

Block S140, which includes depositing the item into the item tote, functions to put the item into the item tote. An item holding and depositing system used with the gantry system may use a variety of different mechanisms. In the example of an actuated item tray, the item tray may tilt or otherwise actuate so as to slide the item into the item tote. The exact positioning of the gantry system may be adjusted based on modeled depositing of the item into the tote based in part on the form of the item. Accordingly, the method may include modeling depositing of the item from the actuated item tray using the dimensional properties of the item and adjusting positioning of the item tray based on the modeled depositing.

Additional block S150, which includes sensing capacity of the item totes and signaling changing of an item tote when a capacity condition is satisfied, functions to manage exchanging of item totes. This process enables exchanging item totes. In a preferred implementation, subsets of the item tote array are exchanged at a time. Sorting of items may continue for the item totes that are available.

Sensing capacity of the item totes can use a tote capacity sensing system. In one variation, sensing capacity of the item totes includes sensing item tote capacity of at least a subset of item totes while the item is translating the item to the designated item tote. A tote capacity sensor can be positioned at or near the item tray (i.e., the receiving mechanism) such that it can pass over item totes while performing. The tote capacity sensor could be a depth sensor that reads the level of items in the item tote to determine individual tote capacity.

The method may use fully autonomous or semi-automated processes for removing item totes at capacity and/or loading an item tote with item capacity.

In a fully autonomous system, the item totes may be attached to an automated conveyor system or other translation devices such that the item totes can be removed. Similarly, empty (or at least not full) item totes may be loaded in an unfilled region of an item tote array. In one implementation an autonomous robot, pallet-jack or tug may engage with item totes when at capacity and remove them from the item tote array. Similarly, new item totes can be automatically inserted into a non-filled item tote space.

In a semi-automated system, signaling changing of an item tote may include triggering an alert and indicating the item tote(s) to be removed. The alert may similarly indicate the assigned grouping and the next task for the item tote. This may alert human workers that can manually or through the aid of some mechanism remove an item tote and/or load an item tote.

Item totes are generally signaled for discharging (using an autonomous or semi-autonomous approach) when the item tote satisfies a capacity condition. The capacity condition may be based on how full the item tote is. However, the method can additionally model expected time and availability to exchange an item tote. For example, an item tote may be removed before it is at a capacity limit to avoid having too many item totes needing exchanging at the same time. As another condition, an item tote may be discharged when the method determines a benefit to having a different mix of groupings allocated within the tote array. For example, an uncommon item tote may be discharged when it has few items such that a new item tote placed in that position can be reassigned to a different grouping through block S160.

Block S160, which includes dynamically assigning grouping location within the item tote array, functions to determine the mapping of grouping to position in the item tote array. Assigning grouping location will involve tracking the assigned item tote until discharging the item tote from the sorting system. This process can be used to dynamically assign groupings. For example, the method may not need to have prior knowledge of all the groupings to be allocated. Instead, the method may dynamically assign groupings to item tote locations based on the groupings that arise from processing the input items. Historical data, analysis of input items, provided item data, and/or other information may be used to predictively assigning grouping locations based on expected item sorting requirements. Various factors may be considered. For example, expected heavier items may have corresponding grouping locations assigned near the transfer location to minimize the distance for placing in an item tote. In another example, groupings that are expected to be more common may be assigned closer to the transfer location. In another example, groupings that are expected to be more common may be redundantly assigned to multiple item totes and then used such that when one is at capacity, the other item tote may be used so that items of that grouping can still be processed while an item tote is exchanged. In another example, a grouping that is less common may be assigned a location that is on the far end of the tote array.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as picking an item from an item input region from a statically positioned robotic system; optionally processing the item while grasped by the robotic system; orienting the item with the robotic system into a transfer position above a receiving mechanism of an item sortation unit and transferring the item to the receiving mechanism of the item sortation unit; translating the item with the item sortation unit above a designated item tote of an array of item totes; and depositing the item into the item tote; optionally sensing capacity of the item totes and signaling changing of an item tote when a capacity condition is satisfied; and optionally dynamically assigning grouping location within the item tote array.

Figure 32:
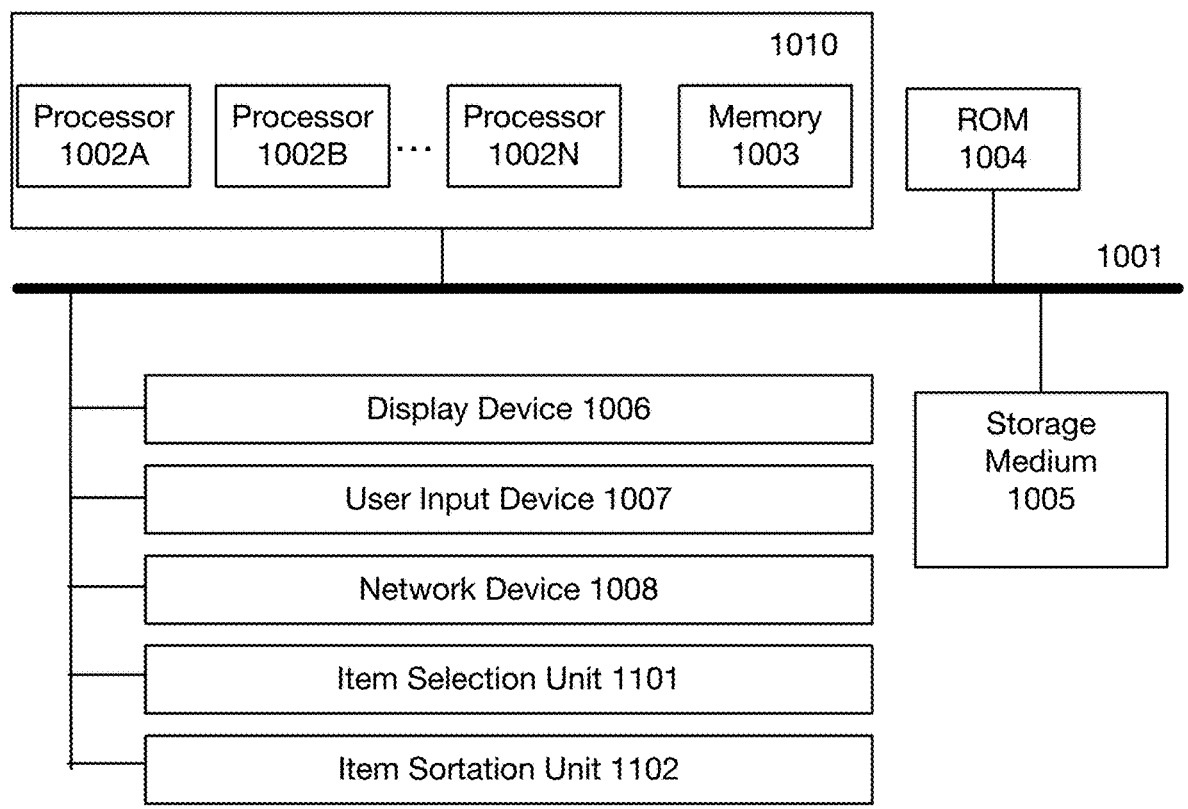
FIG. 32 is an exemplary system architecture that may be used in implementing the system and/or method.

FIG. 32 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting an item selection unit 1101, item sortation unit 1102, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A system, comprising:
   an item selection unit comprising a robotic pick-and-place machine positioned adjacent to a defined input item region comprising a plurality of un-sorted items to be sorted, the item selection unit configured to pick a selected item from the defined input item region based at least in part upon image data captured pertaining to the un-sorted items, move the selected item, and place the selected item on an intermediate transfer system wherein the selected item is exposed to a camera when moved and is placed on the intermediate transfer system with an intermediate placement position and orientation that are based at least in part upon automated analysis of information from the camera and planning placement orientation into an item tote container;
   an item sortation unit comprising a horizontal gantry system and an item tote array comprising a plurality of item tote containers, wherein the horizontal gantry system is positioned above the item tote array;
   wherein the horizontal gantry system comprises a movable elongate horizontal frame member configured to move above the item tote array, and wherein the item sortation unit further comprises an item holding and depositing system that is movably coupled to the movable elongate horizontal frame member, wherein the item holding and depositing system is configured to receive the selected item from the intermediate transfer system and controllably deposit it into a selected item tote container, each of the item holding and depositing system and intermediate transfer system comprising item engagement surfaces which may be removably coupled together in an at least partially intersecting manner such that the selected item may be lifted by the item holding and depositing system in a non-prehensile manner from the intermediate transfer system by causing the item holding and depositing system to approach the intermediate transfer system from below, and to movably and rotatably intersect the intermediate transfer system to position the selected item on the item holding and depositing system such that it may be transported away from the intermediate transfer system toward the item tote array; and a control system comprising one or more processors and one or more non-transitory computer readable mediums storing instructions that, when executed by one or more computer processors, cause the item selection unit to grasp the selected item, orient the selected item into the intermediate placement position and orientation on the intermediate transfer system, transfer the selected item to the item sortation unit using the intermediate transfer system, translate the selected item to the selected item tote container in the item tote array, and deposit the selected item into the selected item tote container.

2. The system of claim 1, wherein a reachable range of the pick-and-place machine overlaps with a reachable range of the item holding and depositing system when actuated by the gantry system.

3. The system of claim 1, wherein the intermediate transfer system is positioned between the item selection unit and the item sortation unit.

4. The system of claim 3, wherein the intermediate transfer system comprises a slotted transfer tray; and wherein the item holding and depositing system is a slotted item tray.

5. The system of claim 1, wherein the item holding and depositing system is a rotationally actuated item container.

6. The system of claim 1, wherein the item holding and depositing system is a sorting robotic pick-and-place machine.

7. The system of claim 1, wherein the item sortation unit further comprises a tote capacity sensor.

8. A method, comprising:
a. picking a selected item from an input region comprising a plurality of un-sorted items to be sorted using a statically positioned robotic system controlled at least in part based upon image data captured pertaining to the un-sorted items;
b. controllably moving the selected item, using the robotic system, and placing the selected item on an intermediate transfer system, wherein the selected item is exposed to a camera when moved and is placed on the intermediate transfer system with an intermediate placement position and orientation that are based at least in part upon automated analysis of information from the camera and planning placement orientation into an item tote;
c. transferring the selected item from the intermediate transfer system to a receiving mechanism of an item sortation unit, the item sortation unit comprising a horizontal gantry system comprising a movable elongate horizontal frame member configured to move above an item tote array; wherein each of the receiving mechanism and intermediate transfer system comprise item engagement surfaces which may be removably coupled together in an at least partially intersecting manner such that the selected item may be lifted by the receiving mechanism from the intermediate transfer system in a non-prehensile manner by causing the receiving mechanism to approach the intermediate transfer system from below, and to movably and rotatably intersect the intermediate transfer system to position the selected item on the receiving mechanism such that it may be transported away from the intermediate transfer system toward the item tote array;
d. translating the selected item, using the horizontal gantry system, to a selected item tote of the array of item totes; and
e. depositing the selected item into the selected item tote.

9. The method of claim 8, wherein controllably moving the selected item comprises moving the selected item into the intermediate placement position and orientation above the receiving mechanism; and wherein transferring the item to the receiving mechanism comprises, at the robotic system, placing the item into the receiving mechanism.

10. The method of claim 8, wherein controllably moving the selected item comprises moving the selected item into the intermediate placement position and orientation upon the intermediate transfer system; and wherein transferring the selected item to the receiving mechanism comprises, at the robotic system, placing the selected item into the intermediate transfer system, and, at the sortation unit, retrieving the selected item from the intermediate transfer system.

11. The method of claim 10, wherein the receiving mechanism comprises a slotted item tray and wherein the intermediate transfer system comprises a slotted transfer tray; and wherein retrieving the selected item from the intermediate transfer system comprises moving the slotted item tray through the slotted transfer tray to collect the selected item into the slotted item tray.

12. The method of claim 8, wherein automated analysis of information from the camera comprises determining dimensional properties of the selected item, and wherein the selected item is placed on the intermediate transfer system with an intermediate placement position and orientation that are based at least in part upon dimensional properties of the selected item and planning placement orientation of the selected item into an item tote.

13. The method of claim 8, wherein, while controllably moving the selected item with the robotic system, determining an identifier of the selected item and determining the selected item tote based at least in part upon the identifier.

14. The method of claim 8, further comprising sensing a capacity of the array of item totes and signaling a changing of an item tote when a capacity condition is satisfied.

15. The method of claim 8, further comprising dynamically assigning a grouping location within the item tote array.

16. A non-transitory computer-readable medium storing instructions that, when executed by one or more computer processors of a computing platform, cause the computing platform to:
a. picking a selected item from an item input region comprising a plurality of un-sorted items to be sorted using a statically positioned robotic system controlled at least in part based upon image data captured pertaining to the un-sorted items;
b. controllably moving the selected item, using the robotic system, and placing the selected item on an intermediate transfer system, wherein the selected item is exposed to a camera when moved and is placed on the intermediate transfer system with an intermediate placement position and orientation that are based at least in part upon automated analysis of information from the camera and planning placement orientation into an item tote;

c. transferring the selected item from the intermediate transfer system to a receiving mechanism of an item sortation unit, the item sortation unit comprising a horizontal gantry system comprising a movable elongate horizontal frame member configured to move above an item tote array; wherein each of the receiving mechanism and intermediate transfer system comprise item engagement surfaces which may be removably coupled together in an at least partially intersecting manner such that the selected item may be lifted in a non-prehensile manner by the receiving mechanism from the intermediate transfer system by causing the receiving mechanism to approach the intermediate transfer system from below, and to movably and rotatably intersect the intermediate transfer system to position the selected item on the receiving mechanism such that it may be transported away from the intermediate transfer system toward the item tote array;

d. translating the selected item, using the horizontal gantry system, to a selected item tote of the array of item totes; and e. depositing the selected item into the selected item tote.

17. The non-transitory computer-readable medium of claim 16, wherein controllably moving the selected item comprises moving the selected item into the intermediate placement position and orientation above the receiving mechanism; and wherein transferring the item to the receiving mechanism comprises, at the robotic system, placing the item into the receiving mechanism.

18. The non-transitory computer-readable medium of claim 16, wherein controllably moving the selected item comprises moving the selected item into the intermediate placement position and orientation upon the intermediate transfer system; and wherein transferring the selected item to the receiving mechanism comprises, at the robotic system, placing the selected item into the intermediate transfer system, and, at the sortation unit, retrieving the selected item from the intermediate transfer system.

19. The non-transitory computer-readable medium of claim 18, wherein the receiving mechanism comprises a slotted item tray and wherein the intermediate transfer system comprises a slotted transfer tray, and wherein retrieving the selected item from the intermediate transfer system comprises moving the slotted item tray through the slotted transfer tray to collect the selected item into the slotted transfer tray.

20. The non-transitory computer-readable medium of claim 16, further comprising, while controllably orienting the selected item, determining dimensional properties of the selected item; and wherein controllably orienting the selected item comprises controllably orienting the selected item into a transfer position for controlled item depositing into an item tote based at least in part upon the dimensional properties of the selected item.

* * * * *